US012767910B2

(12) United States Patent
Vuylsteke

(10) Patent No.: US 12,767,910 B2
(45) Date of Patent: Oct. 20, 2026

(54) BALLASTED PIGEAGE DEVICE SYSTEM AND METHOD

(71) Applicant: Amaterra, LLC, Beaverton, OR (US)

(72) Inventor: Matthew Richard Vuylsteke, Portland, OR (US)

(73) Assignee: Amaterra, LLC, Beaverton, OR (US)

( * ) Notice: Subject to any disclaimer, the term of this patent is extended or adjusted under 35 U.S.C. 154(b) by 640 days.

(21) Appl. No.: 18/143,009

(22) Filed: May 3, 2023

(65) Prior Publication Data

US 2023/0357680 A1 Nov. 9, 2023

Related U.S. Application Data

(60) Provisional application No. 63/337,760, filed on May 3, 2022, provisional application No. 63/337,764, filed on May 3, 2022.

(51) Int. Cl.

| | |
|---|---|
| ***C12G 1/02*** | (2006.01) |
| ***B30B 9/22*** | (2006.01) |
| ***C12H 1/22*** | (2006.01) |

(52) U.S. Cl.

CPC .................. *C12G 1/02* (2013.01); *B30B 9/22* (2013.01); *C12H 1/22* (2013.01); *C12G 2200/25* (2013.01)

(58) Field of Classification Search

CPC ........ C12G 1/02; C12G 2200/25; B30B 9/22; C12H 1/22

USPC ............................................................ 426/15

See application file for complete search history.

(56) References Cited

U.S. PATENT DOCUMENTS

D854,892 S * 7/2019 Bacher ........................... D7/669
2017/0216795 A1* 8/2017 Singh .................. B01F 27/2312

FOREIGN PATENT DOCUMENTS

FR 2956143 A1 8/2011

OTHER PUBLICATIONS

English translation; FR-2956143-A1, 2011.*
Chateau Hetsakais, Winery Overview, accessed at <https://chateauhetsakais.com/overview-winery>, Dec. 2021, 10 pages.
Lemelson, "Our Story, Lemelson Wines," accessed at <https://www.lemelsonvineyards.com/our-story/>, 9 pages.

(Continued)

*Primary Examiner* — Nikki H. Dees
*Assistant Examiner* — Philip A Dubois
(74) *Attorney, Agent, or Firm* — Davis Wright Tremaine LLP

(57) ABSTRACT

Methods and systems are provided for gravity-assisted winemaking and other fermentation processes. In one example, a method may include using gravity to process grapes or a fermentate from a first upper location to a lower location and using a bridge crane to transfer the grapes or the fermentate to a second upper location to be further processed. In certain examples, the lower location may be located on a lower level of a building and the first and second upper locations may be located on an upper level of the building. In an additional or alternative example, the method may include using the bridge crane to translate a punch down device along orthogonal axes, including lowering the punch down device into a vessel containing a liquid on which a cap of solids floats. In certain examples, the vessel may be transferred between the upper and lower levels using the bridge crane.

13 Claims, 15 Drawing Sheets

(56) References Cited

OTHER PUBLICATIONS

USPTO Office Action dated Jun. 4, 2025, U.S. Appl. No. 18/143,007, 28 pages.

Anonymous, "What is a Bridge Crane?," FineworkCranes.com accessed on May 13, 2026 from https://www.fwcranes.com/info/what-is-a-bridge-crane-30643854.html, Nov. 17, 2018, 5 pages.

USPTO Office Action dated May 27, 2026, U.S. Appl. No. 18/143,007, 33 pages.

* cited by examiner

BALLASTED PIGEAGE DEVICE SYSTEM AND METHOD

CROSS-REFERENCE TO RELATED APPLICATIONS

The present application claims priority to each of U.S. Provisional Application No. 63/337,760, entitled "GRAVITY FLOW WINEMAKING SYSTEM AND METHOD USING BRIDGE CRANES" and filed on May 3, 2022, and U.S. Provisional Application No. 63/337,764, entitled "BALLASTED PIGEAGE DEVICE SYSTEM AND METHOD" and filed on May 3, 2022. The entire contents of each of the above-identified applications are hereby incorporated by reference for all purposes.

FIELD

Embodiments of the subject matter disclosed herein relate to winemaking and other fermentation processes, and more particularly to systems and methods utilizing bridge cranes and other overhead cranes, such as for gravity-assisted processing and pigeage.

BACKGROUND

Winemaking originates from lengthy, labor-intensive processes. Wines are typically produced in multiple stages, with each stage being initiated by processing products from a previous stage. To extract the products, various pumps, presses, filters, and other processing equipment may be employed to obtain desirable portions, e.g., filtrates, from previous stages. At certain production scales, at least some stages involve a manual component. For example, punching down floating grape solids in vessels to submerge the grape solids (e.g., for further flavor and color extraction), a process sometimes known as maceration or pigeage, may involve one or more winemakers utilizing a punch down tool operated by hand.

To achieve large-scale production, many manual operations are replaced by costly, complex, and/or specialized tools which, at least in part, automate such operations. Pigeage, for instance, may be accomplished through use of a pneumatic punch down tool. However, equipment maintenance in such cases may be expensive, at least because components may be developed only for specific tools, contamination (e.g., between components) may be practically unavoidable, and skilled labor may be necessary to perform the maintenance. Moreover, at least because many stages and large quantities of wine are involved, such tools may take up a significant aggregate footprint at such scales. Certain techniques, such as gravity-assisted processing techniques, may utilize even greater space. It may be advantageous to improve efficiency and reduce costs, contamination, and footprint in production-scale winemaking.

BRIEF DESCRIPTION OF THE DRAWINGS

Various embodiments and techniques will be described with reference to the drawings, in which.

DETAILED DESCRIPTION

Figure 1A:
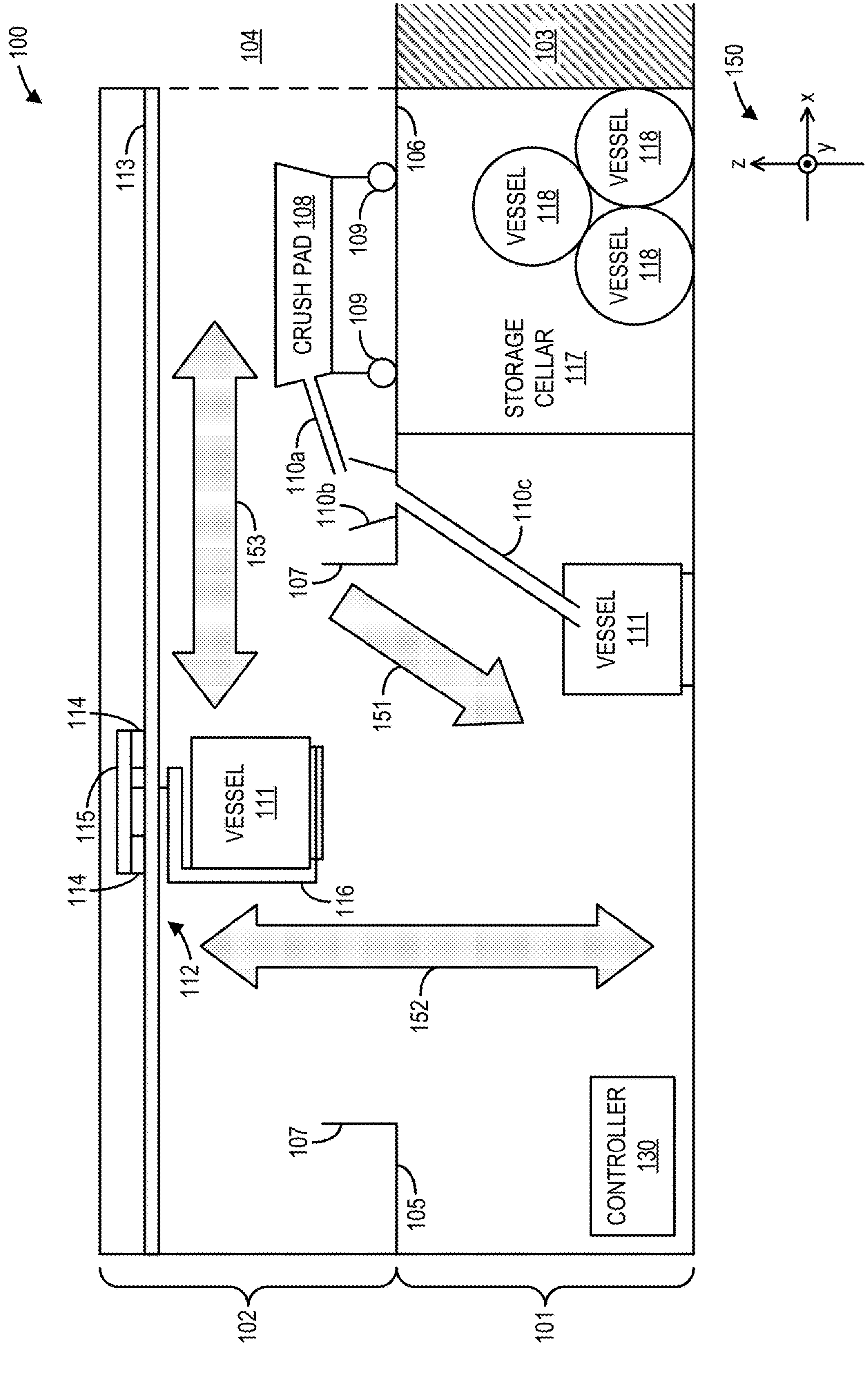
FIG. 1A shows a schematic diagram of a winery during a first stage of winemaking, the winery including one or more bridge cranes operable to transfer objects between a lower level of the winery and an upper level of the winery, in accordance with at least one embodiment.

Techniques described and suggested herein include at least one embodiment of a method for a production area of a winery, the method including: receiving, at an upper level of the production area, a mobile crush pad containing harvested pinot noir grapes; processing the harvested pinot noir grapes to obtain processed pinot noir grapes, including using gravity to transfer at least a portion of the harvested pinot noir grapes from the mobile crush pad to a fermentation vessel located at a lower level of the production area; lifting, using a bridge crane, the fermentation vessel from the lower level to the upper level; fermenting, at the upper level, the processed pinot noir grapes to obtain a fermentate; draining a first portion of the fermentate by using gravity to transfer the first portion of the fermentate from the upper level to a settling vessel located at the lower level; pressing a second portion of the fermentate by using gravity to flow the second portion of the fermentate through a press and to the settling vessel, the second portion of the fermentate having a higher content of solids than the first portion of the fermentate; lifting, using the bridge crane, the settling vessel from the lower level to the upper level; settling the fermentate by using gravity to transfer at least a portion of the fermentate from the upper level to a storage vessel located on the lower level; and removing the fermentate from the storage vessel to produce a red wine, wherein the upper level may be a mezzanine which may form a balcony over the lower level, such that at least a portion of the upper level and at least a portion of the lower level may be visible from a single vantage point.

In at least one embodiment, a method may include: receiving, at a crush pad located at a first upper location, harvested grapes; processing the harvested grapes to obtain processed grapes, including using gravity to transfer at least a portion of the harvested grapes from the crush pad to a fermentation vessel located at a first lower location; lifting, using one of one or more bridge cranes, the fermentation vessel from the first lower location to a second upper location; fermenting, at the second upper location, the processed grapes to obtain a fermentate; draining a first portion of the fermentate by using gravity to transfer the first portion of the fermentate from the second upper location to a settling vessel located at a second lower location; pressing a second portion of the fermentate by using gravity to flow the second portion of the fermentate through a press and to the settling vessel; lifting, using one of the one or more bridge cranes, the settling vessel from the second lower location to a third upper location; and settling the fermentate by using gravity to transfer at least a portion of the fermentate from the third upper location to a storage vessel located at a third lower location.

In at least one embodiment, a method for a winery may include an ordered sequence of steps including: using gravity to transfer grapes from an upper level of the winery to a lower level of the winery, such that the grapes may be sorted and destemmed upon reaching the lower level; using a bridge crane to transfer the grapes from the lower level to the upper level, whereat the grapes may be fermented to produce a fermentate; using gravity to transfer the fermentate from the upper level to the lower level, such that the fermentate may be drained and pressed upon reaching the lower level; using the bridge crane to transfer the fermentate from the lower level to the upper level, whereat the fermentate may be settled to separate a first portion of the fermentate from a second portion of the fermentate, the first portion of the fermentate having a lower content of solids than the second portion of the fermentate; and using gravity to transfer the first portion of the fermentate from the upper level to the lower level.

Techniques described and suggested herein further include at least one embodiment of a method for fermentation of pinot noir grapes, the method including: forming, in a fermentation vessel, a cap of pinot noir grape solids which may float on a fermentate during the fermentation; positioning, using a bridge crane, a ballasted punch down device over the fermentation vessel, the ballasted punch down device including: a stainless steel cylindrical housing; one or more venting apertures extending between bases of the stainless steel cylindrical housing; one or more plastic bumpers extending outwardly from the stainless steel cylindrical housing; a concrete ballast hermetically sealed within the stainless steel cylindrical housing, the concrete ballast circumscribing the one or more venting apertures; and an extendable handle extending outwardly from the fermentation vessel; responsive to the ballasted punch down device not being suspended over the cap of pinot noir grape solids, adjusting, using the extendable handle, a position of the ballasted punch down device over the fermentation vessel; and submerging, using the bridge crane, the ballasted punch down device in the fermentation vessel such that the cap of pinot noir grapes solids may be disturbed to increase maceration of the cap of pinot noir grape solids and at least a portion of the cap of pinot noir grape solids and at least a portion of the fermentate may freely pass through the one or more venting apertures.

In at least one embodiment, a method for fermentation of wine grapes may include: forming, in a fermentation vessel, a cap of grape solids which floats on a fermentate during the fermentation; positioning, using a bridge crane, a ballasted punch down device over the fermentation vessel; and lowering, using the bridge crane, the ballasted punch down device into the fermentation vessel such that the cap of grape solids may be disturbed.

In at least one embodiment, a method may include using a bridge crane to translate a ballasted punch down device along a first axis, the ballasted punch down device being suspended from a girder of the bridge crane; and using the bridge crane to translate the ballasted punch down device along a second axis orthogonal to the first axis, including lowering the ballasted punch down device into an open vessel containing a liquid on which a cap of solids floats.

These, as well as other aspects, advantages, and alternatives will become apparent to those of ordinary skill in the art by reading the following detailed description, with reference where appropriate to the accompanying drawings. Further, it should be understood that descriptions and figures provided herein are intended to illustrate the invention by way of example only and, as such, that numerous variations are possible.

For example, the following description relates to various embodiments of systems and methods for gravity-assisted winemaking, gravity-assisted fruit handling, and other fermentation processes which may utilize gravity. For instance, production of red wines, such as a wine sourced from pinot noir grapes, may involve a spectrum of winemaking techniques, some of which may be assisted, driven, or supplanted by gravity. As examples of one end of the spectrum, processing of pinot noir grapes may include handpicking, destemming, and/or crushing the grapes and/or transferring a resultant slurry (e.g., including juice, pulp, skins, and/or seeds) through pumps (e.g., which may be specifically sized and configured for such a slurry). At any stage, such processing may result in increased contamination and/or pulverization of the grapes and slurries. Gravity handling techniques (also referred to as gentle handling techniques) may be included at another end of the spectrum, and may be utilized to ameliorate quality degradation resulting from such processing. In some embodiments, such as in the production of red wines, gravity handling techniques may be implemented to promote tannin polymerization. In certain embodiments, gravity handling techniques may be reduced or not utilized for white wines, which have lower amounts of tannins.

Figure 8:
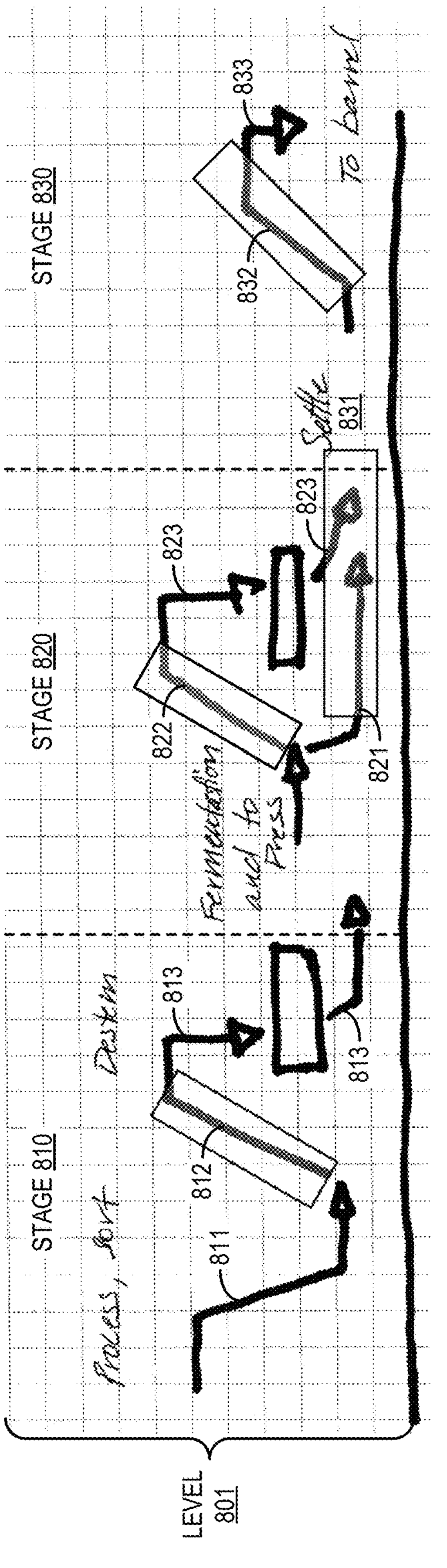
FIG. 8 shows a schematic diagram of a first process for gravity-assisted winemaking, the first process implemented in a single-level winery, in accordance with at least one embodiment.

In certain embodiments, gravity handling may be implemented on a single level of a winery. Referring now to FIG. 8, a schematic diagram of a first process for gravity-assisted winemaking is depicted. In FIG. 8, the first process is implemented on a (single) level 801 (e.g., a building story or other such vertical division of a structure) of a winery. In the first process, material is lifted from a floor level via elevator conveyor(s) and/or forklift(s) such that gravity may be leveraged for various stages of winemaking.

As shown, a first stage 810 may include processing received grapes for fermentation, the processing including sorting 811 and destemming 813 the grapes. Specifically, the first stage 810 may include using gravity to sift or otherwise sort 811 excess (e.g., non-fermentable) material from the received grapes. The first stage 810 may further include, once the (sorted) grapes are at the floor level, lifting 812 the grapes so as to use gravity to assist manual and/or automated destemming 813 the grapes.

A second stage 820 may include fermenting the processed grapes, including draining 821 and pressing 823 a fermentate resulting from (initial stages of) the fermentation. Specifically, the second stage 820 may include using gravity to drain 821 a first portion of the fermentate, e.g., from a fermentation vessel. The second stage 820 may further include, in tandem with or following the draining 821, lifting 822 a second portion of the fermentate so as to use gravity to assist a press in pressing 823 the second portion (e.g., which may be recombined with the first portion following the pressing 823).

A third stage 830 may include settling 831 the drained and pressed portions of the fermentate for barreling 833. Specifically, the third stage 830 may include using gravity to settle 831 the drained and pressed portions of the fermentate. The third stage 830 may further include, following the settling 831, lifting 832 the settled (and drained and pressed) fermentate so as to use gravity to barrel 833 the settled fermentate.

In the first process, at least three lifting operations (e.g., 812, 822, and 832) may be leveraged such that gravity may be relied upon for various steps during the winemaking (in some examples, another lifting step may be involved to place the grapes in position for initial sorting 811). However, significant square footage may be reserved for operation of the forklift(s) and/or elevator conveyor(s). Moreover, at least the forklift(s) may involve specialized manual operation. Thus, space and labor restrictions may significantly limit scalability of the first process.

Figure 9:
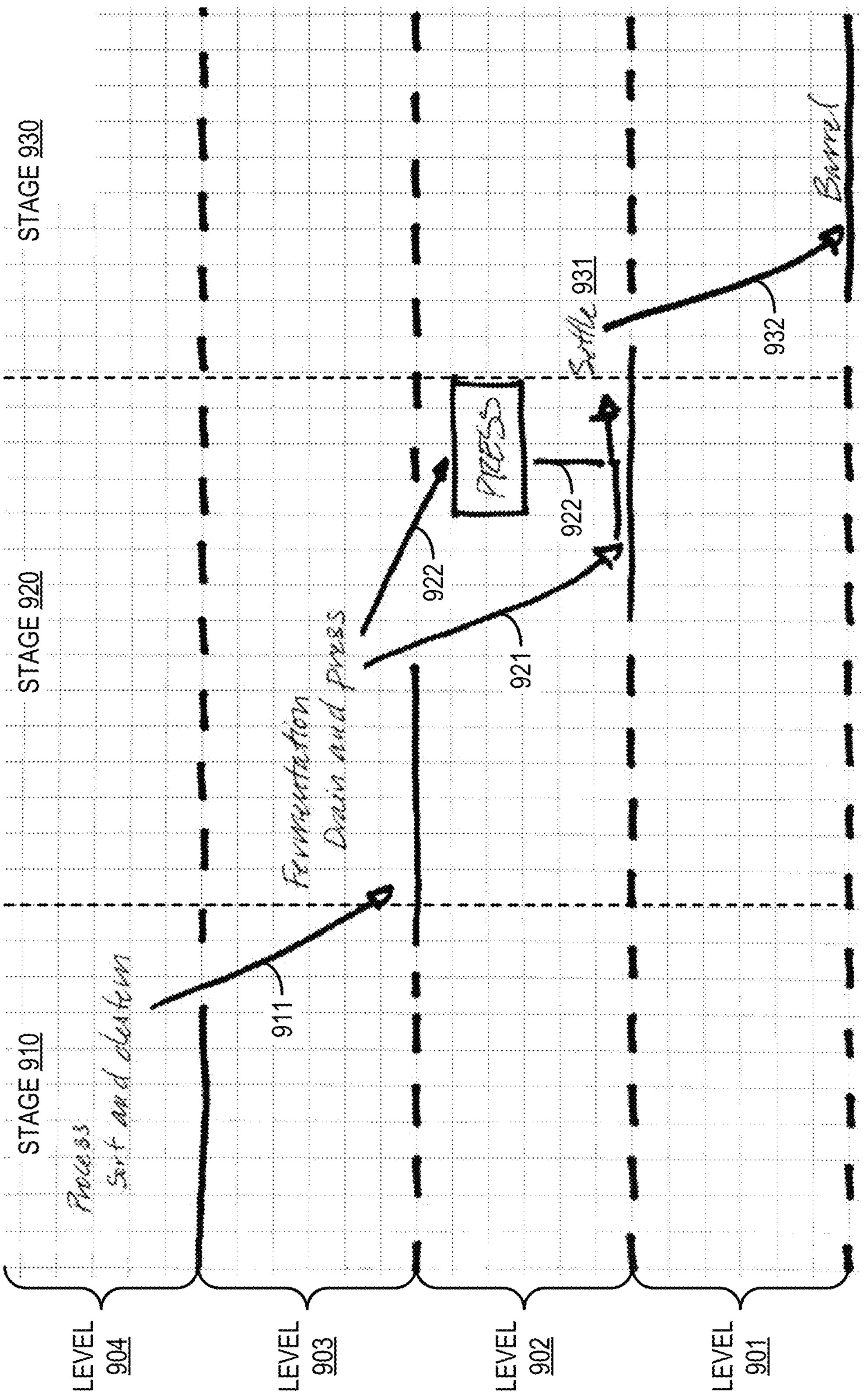
FIG. 9 shows a schematic diagram of a second process for gravity-assisted winemaking, the second process implemented in a four-level winery, in accordance with at least one embodiment.

Another option is to add a separate level of the winery for every step (or every other step) which relies, at least in part, on gravity. Referring now to FIG. 9, a schematic diagram of a second process for gravity-assisted winemaking is depicted. In FIG. 9, the second process is implemented on four levels (a first level 901, a second level 902, a third level 903, and a fourth level 904) of a winery. In some embodiments of the second process, material is initially lifted to the fourth level 904 such that gravity may be leveraged for various stages of winemaking. In other embodiments of the second process, the winery may be at least partially subterranean (e.g., the winery may be a bermed structure), such that the fourth level 904 is at or closer to a ground level than were the first level 901 even with the ground level.

As shown, a first stage 910 may include processing received grapes for fermentation, the processing including sorting and destemming 911 the grapes. Specifically, the first stage 910 may include using gravity to sift or otherwise sort excess (e.g., non-fermentable) material from the received grapes and thereafter destem 911 the (sorted) grapes. For example, the sorting may bring the grapes to a floor level of the fourth level 904, and the grapes may then be transferred to the third level 903 such that gravity may be used to destem 911 the grapes as the grapes are transferred.

A second stage 920 may include fermenting the processed grapes, including draining 921 and pressing 922 a fermentate resulting from (initial stages of) the fermentation. Specifically, the second stage 920 may include using gravity to drain 921 a first portion of the fermentate, e.g., from a fermentation vessel. The second stage 920 may further include, in tandem with or following the draining 921, using gravity to assist a press in pressing 922 a second portion of the fermentate (e.g., which may be recombined with the first portion following the pressing 922). For example, the first and second portions of the fermentate may be transferred from the third level 903 to the second level 902 such that gravity may be used to drain 921 and press 922 the first and second portions as the first and second portions are transferred.

A third stage 930 may include settling 931 the drained and pressed portions of the fermentate for barreling 932. Specifically, the third stage 930 may include using gravity to settle 931 the drained and pressed portions of the fermentate. The third stage 930 may further include, following the settling 931, using gravity to assist in barreling 932 the settled (and drained and pressed) fermentate. The settling 931 and barreling 932 of the fermentate may be conducted in two stages or one continuous (e.g., uninterrupted) process of moving the (settled) fermentate from the second level 902 into one or more barrels located on the first level 901. For example, the settling 931 may bring the fermentate to a floor level of the second level 902 to be transferred to the one or more barrels located on the first level 901 and/or the settled fermentate may be directly transferred (e.g., following or during the settling 931 such that a portion of the fermentate which is to be barreled 932 is periodically or continuously transferred to one or more barrels without any intermediate storage) from the second level 902 to the one or more barrels located on the first level 901 such that gravity may be used to barrel 932 the settled fermentate.

In the second process, instead of relying on at least three lifting operations (such as in the first process of FIG. 8), at least three additional levels (e.g., 902, 903, and 904) may be leveraged such that gravity may be relied upon for various steps during the winemaking. However, given that space is set aside on each of four levels of the winery, significant square footage may be reserved for the winemaking. As such, the second process may be relatively inefficient from a square footage utilization perspective.

Figure 10:
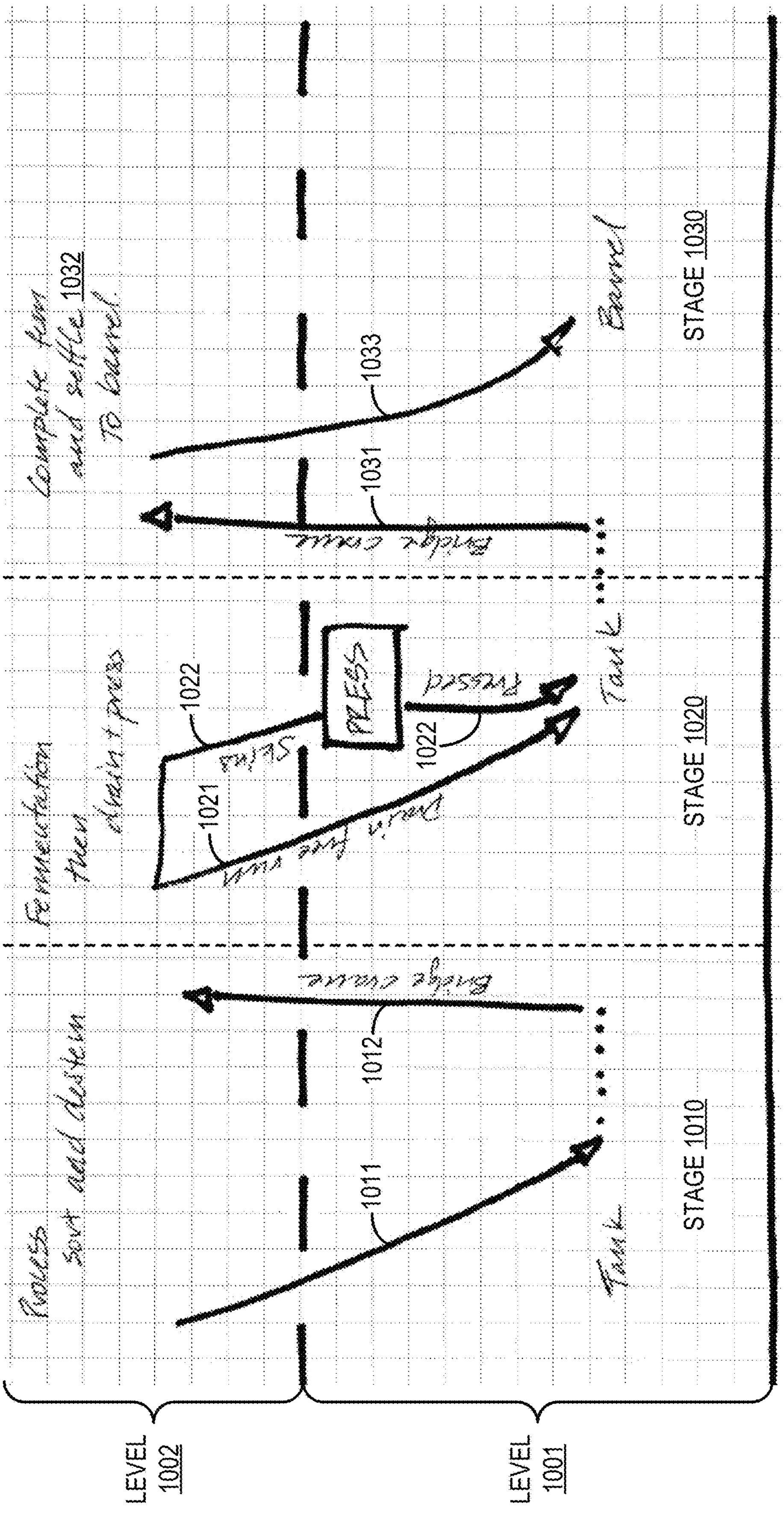
FIG. 10 shows a schematic diagram of a third process for gravity-assisted winemaking, the third process implemented in a two-level winery, in accordance with at least one embodiment.

Accordingly, in at least one embodiment provided herein, a winery may include an open space from which each of a lower level and an upper level are accessible by one or more bridge cranes [and/or other overhead crane(s)], wherein the one or more bridge cranes are operable to lift vessels from the lower level to the upper level such that material in the vessels may be transferred from the upper level back to the lower level using gravity. Referring now to FIG. 10, a schematic diagram of a third process for gravity-assisted winemaking is depicted. In FIG. 10, the third process is implemented on two levels (a lower level 1001 and an upper level 1002) of a winery. The winery may include one or more bridge cranes which are operable to transfer objects between the two levels of the winery. In some embodiments, the two levels of the winery are not fully partitioned, e.g., by a floor therebetween, in that the upper level 1002 does not fully extend over a building footprint of the winery (e.g., the upper level 1002 may include a balcony which opens onto the lower level 1001). In such embodiments, the one or more bridge cranes may have an unobstructed path for transferring objects between the lower level 1001 and the upper level 1002. In some embodiments of the third process, material is initially lifted to the upper level 1002 such that gravity may be leveraged for various stages of winemaking. In other embodiments of the third process, the winery may be at least partially subterranean (e.g., the winery may be a bermed structure), such that the upper level 1002 is at or closer to a ground level than were the lower level 1001 even with the ground level.

As shown, a first stage 1010 may include processing received grapes for fermentation, the processing including sorting and destemming 1011 the grapes. Specifically, the first stage 1010 may include using gravity to sift or otherwise sort excess (e.g., non-fermentable) material from the received grapes and thereafter destem 1011 the (sorted) grapes. For example, the sorting may bring the grapes to a floor level of the upper level 1002, and the grapes may then be transferred to the lower level 1001 such that gravity may be used to destem 1011 the grapes as the grapes are transferred. The first stage 1010 may further include, once the (sorted and destemmed) grapes are at the lower level 1001, lifting 1012 the grapes (back) to the upper level 1002 using one of the one or more bridge cranes so that gravity may be used to assist further stages of the winemaking.

A second stage 1020 may include fermenting the processed grapes, including draining 1021 and pressing 1022 a fermentate resulting from (initial stages of) the fermentation. Specifically, the second stage 1020 may include using gravity to drain 1021 a first portion of the fermentate, e.g., from a fermentation vessel. The second stage 1020 may further include, in tandem with or following the draining 1021, using gravity to assist a press in pressing 1022 a second portion of the fermentate (e.g., which may be recombined with the first portion following the pressing 1022). For example, the first and second portions of the fermentate may be transferred from the upper level 1002 to the lower level 1001 such that gravity may be used to drain 1021 and press 1022 the first and second portions as the first and second portions are transferred.

A third stage 1030 may initially include lifting 1031 the drained and pressed portions of the fermentate (back) to the upper level 1002 using one of the one or more bridge cranes so that gravity may be used to assist further stages of the winemaking. The third stage 1030 may further include settling 1032 the drained and pressed portions of the fermentate for barreling 1033. Specifically, the third stage 1030 may include using gravity to settle 1032 the drained and pressed portions of the fermentate. The third stage 1030 may further include, following the settling 1032, using gravity to assist in barreling 1033 the settled (and drained and pressed) fermentate. The settling 1032 and barreling 1033 of the fermentate may be conducted in two stages or in one continuous (e.g., uninterrupted) process of moving the (settled) fermentate from the upper level 1002 into one or more barrels located on the lower level 1001. For example, the settling 1032 may bring the fermentate to a floor level of the upper level 1002 to be transferred to the one or more barrels located on the lower level 1001 and/or the settled fermentate may be directly transferred (e.g., following or during the settling 1032 such that a portion of the fermentate which is to be barreled 1033 is periodically or continuously transferred to one or more barrels without any intermediate storage) from the upper level 1002 to the one or more barrels located on the lower level 1001 such that gravity may be used to barrel 1033 the settled fermentate.

In the third process, lifting operations (e.g., 1012 and 1031) are leveraged as in the first process of FIG. 8, as are multiple levels (e.g., 1001 and 1002) as in the second process of FIG. 9.

In an exemplary embodiment, using the one or more bridge cranes to perform the lifting operations between the lower level 1001 and the upper level 1002 achieves additional advantages not found in either the first process or the second process alone. As an example, lifting objects with the one or more bridge cranes allows vertical space within the winery to be reused and thus gravity may be utilized numerous times during the winemaking without requiring an additional floor for each gravity-assisted stage. As another example, by using two levels which open onto one another (e.g., the upper level 1002 may form a balcony over the lower level 1001), the one or more bridge cranes may be implemented to obviate certain complex and/or contaminating equipment (e.g., forklifts, elevator conveyors, etc.). As an additional benefit, in such an example, an entire winemaking process may be observed from a single vantage point. By combining certain features of each of the first and second processes in a novel and non-obvious manner, as well as integrating use of the one or more bridge cranes in material and equipment handling, an improved gravity-assisted winemaking process may be realized in at least one embodiment and which may provide a framework for additional development.

For example, the one or more bridge cranes may assist in pigeage during fermentation. Skins are included during fermentation, e.g., of red wines, for color and flavor extraction. However, $CO_2$ evolved during such fermentation floats the skins and other grape components to a top of a fermentate so as to form a cap of solids. Because the cap of solids floats on the top of the fermentate, color and flavor extraction may be limited and the fermentation may overheat. Punching down and mixing (a process also referred to herein as pigeage or maceration) the cap of solids may mitigate such issues. In production of pinot noir based wines, for instance, punching down the cap of solids may improve flavor and color extraction and maintain or reduce fermentation temperature, and may also be considered a gentle handling process which can avoid over-extracting bitter compounds for a given weight of fermentate. Certain embodiments involve manual punch down methods, such as a winemaker mixing the cap of solids with a plunger or other punch down device. However, such manual punch down methods may be labor intensive and relatively slow. Other embodiments involve semi-automated pneumatic systems in which air pressure fills a cylinder to induce a spool with a plunger or other punch down device through the cap of solids. However, such semi-automated methods may be relatively complex and costly and may result in excess contamination via growth of juice and spoilage organisms in the cylinder due to seal failure.

In at least one embodiment provided herein, a ballasted punch down device may be suspended from a girder of a bridge crane, such that the ballasted punch down device may be utilized in pigeage by operating the bridge crane to lower and lift the ballasted punch down device in a fermentation vessel. In an exemplary embodiment, the bridge crane may position the ballasted punch down device over the fermentation vessel with respect to at least one horizontal axis (e.g., parallel to a floor of the winery). Once the ballasted punch down device is positioned over the fermentation vessel, the bridge crane may lower the ballasted punch down device into the fermentation vessel such that a cap of grape solids floating in the fermentation vessel may be disturbed. The ballasted punch down device may include a housing which encloses a ballast, wherein the ballast may be included such that the ballasted punch down device lowers vertically without substantially altering horizontal position and submerges into a fermentate within the fermentation vessel with reduced difficulty (when the term "substantially" is used herein, it is meant that the recited relationship, characteristic, parameter, or value need not be realized with exact precision, but that deviations or variations known to those of skill in the art may occur to an extent that does not preclude the effect the relationship, characteristic, parameter, or value was intended to provide). Advantageously, in at least one embodiment, pigeage may be accomplished by utilizing a bridge crane to position a ballasted punch down device in three-dimensional space with increased precision and/or speed and/or reduced, or substantially no, contamination and/or manual labor.

Figure 1B:
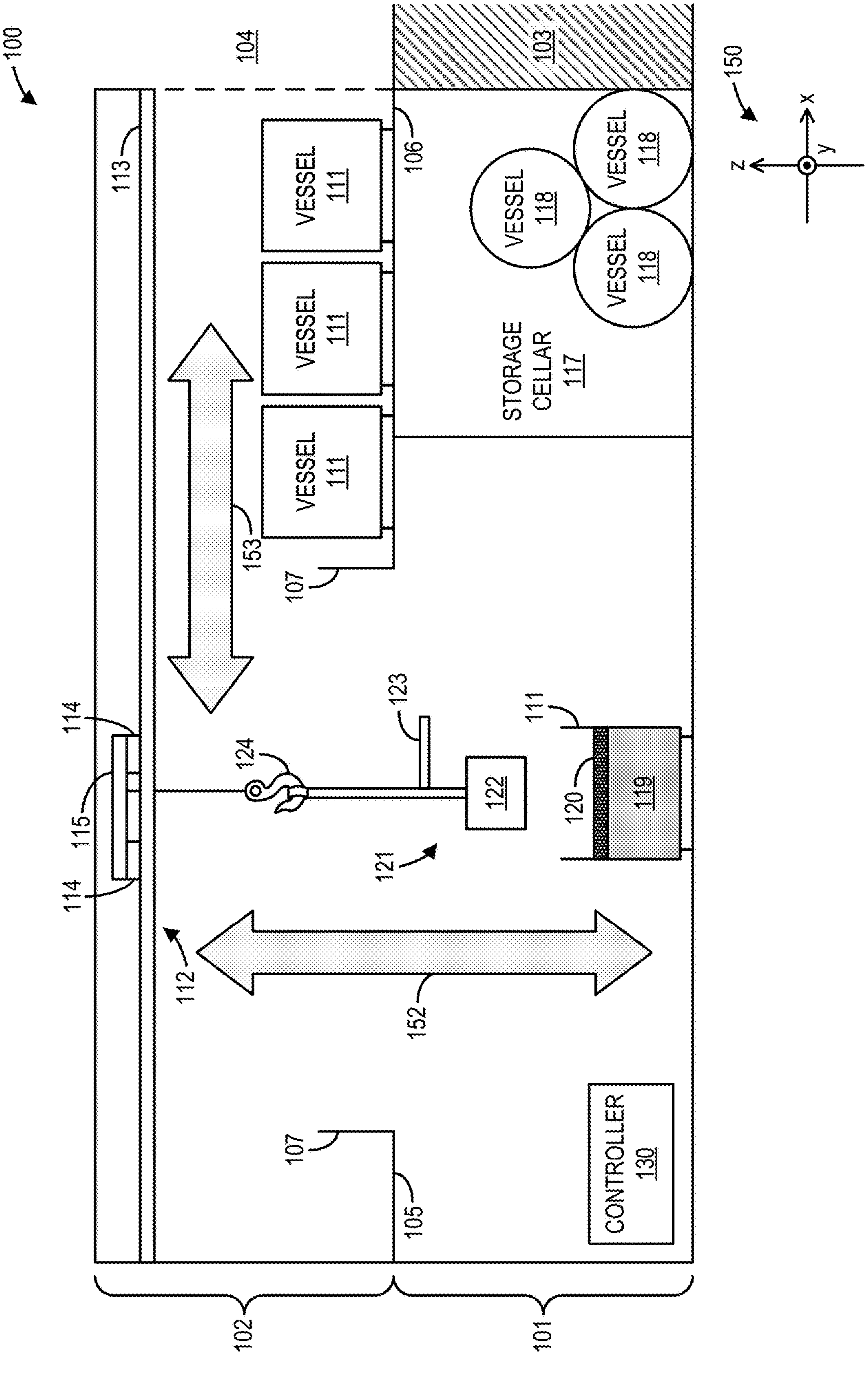
FIG. 1B shows a schematic diagram of the winery of FIG. 1A during a second stage of winemaking, in accordance with at least one embodiment.
Figure 1C:
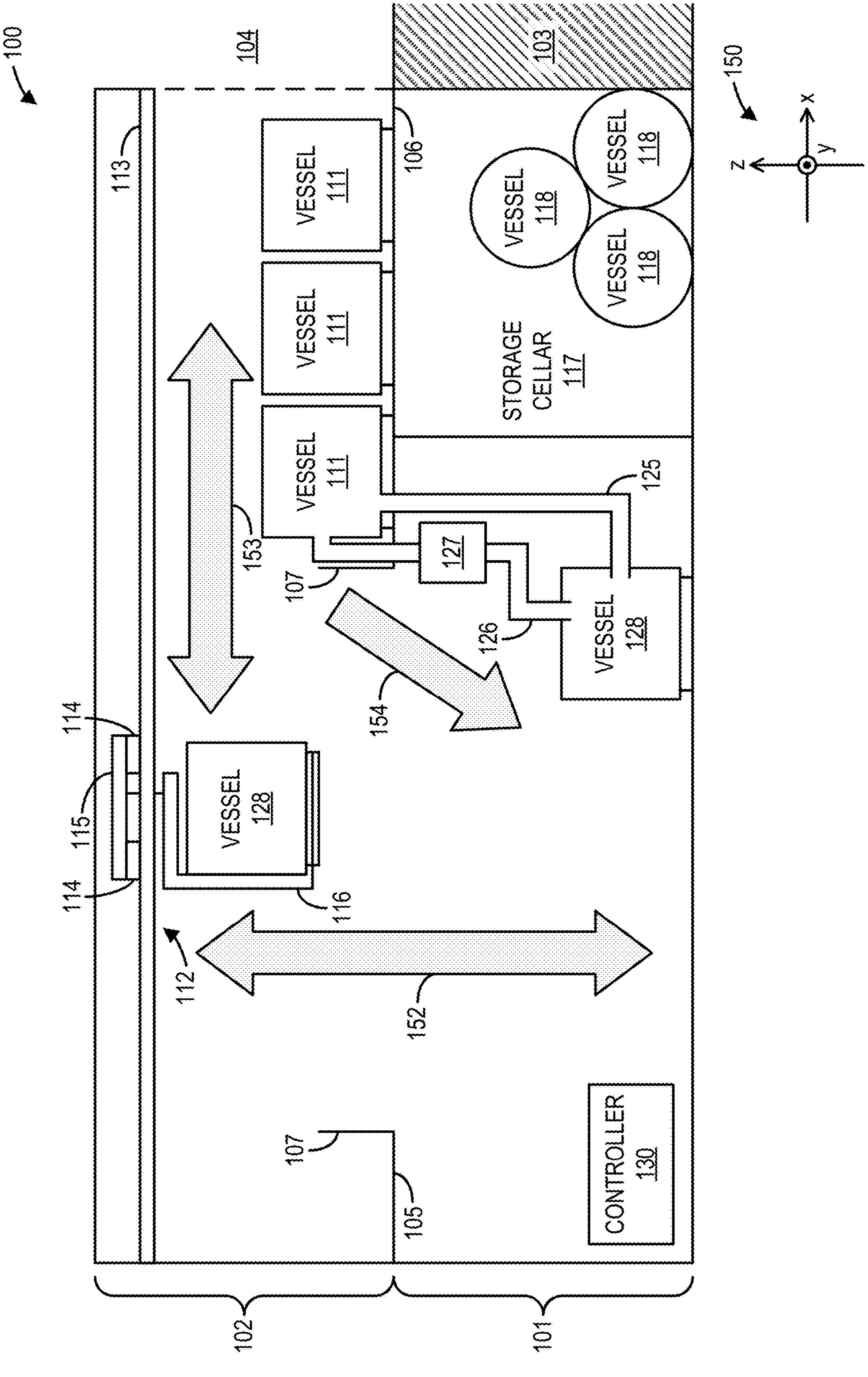
FIG. 1C shows a schematic diagram of the winery of FIG. 1A during a third stage of winemaking, in accordance with at least one embodiment.
Figure 1D:
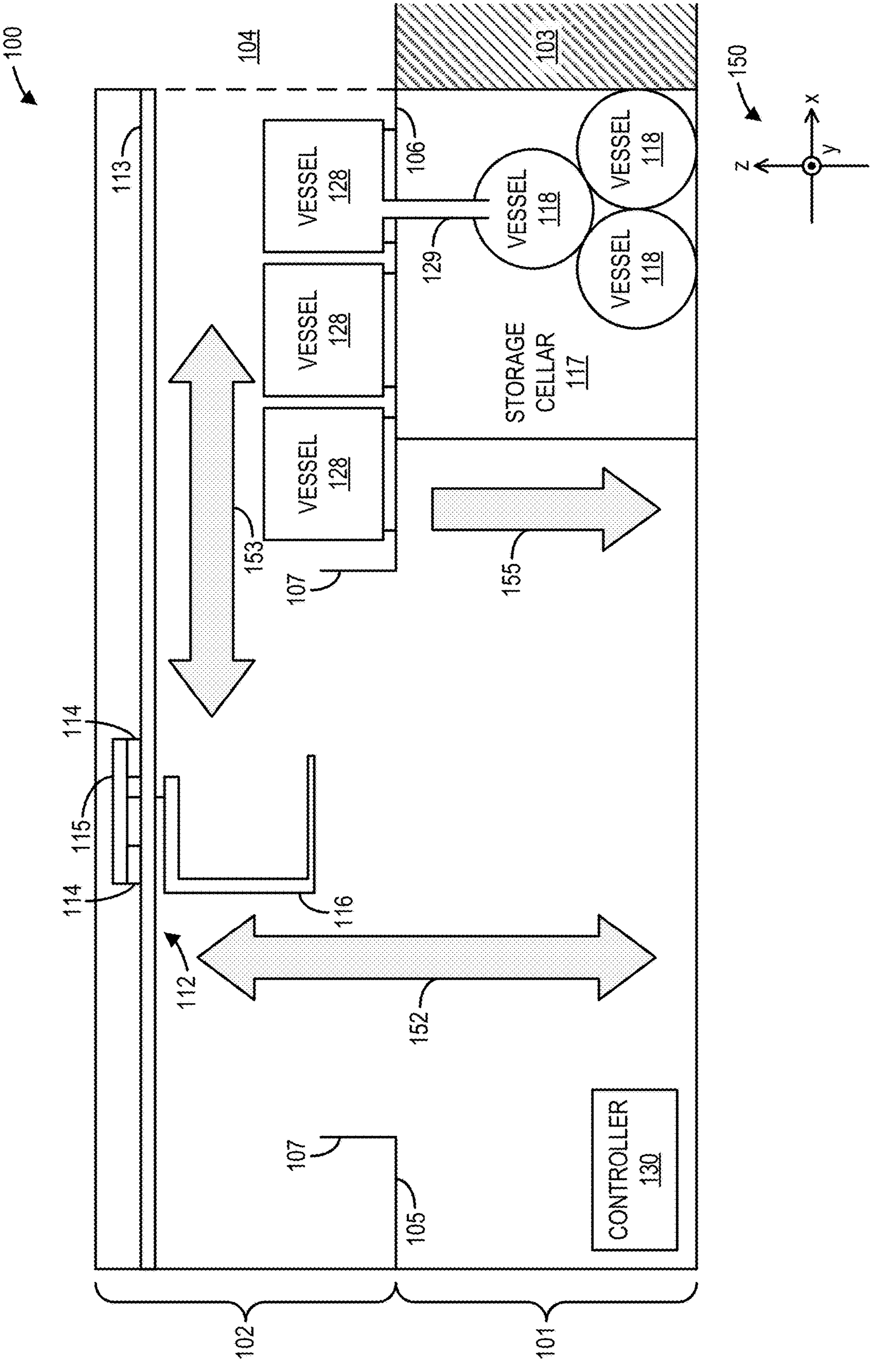
FIG. 1D shows a schematic diagram of the winery of FIG. 1A during a fourth stage of winemaking, in accordance with at least one embodiment.
Figure 2:
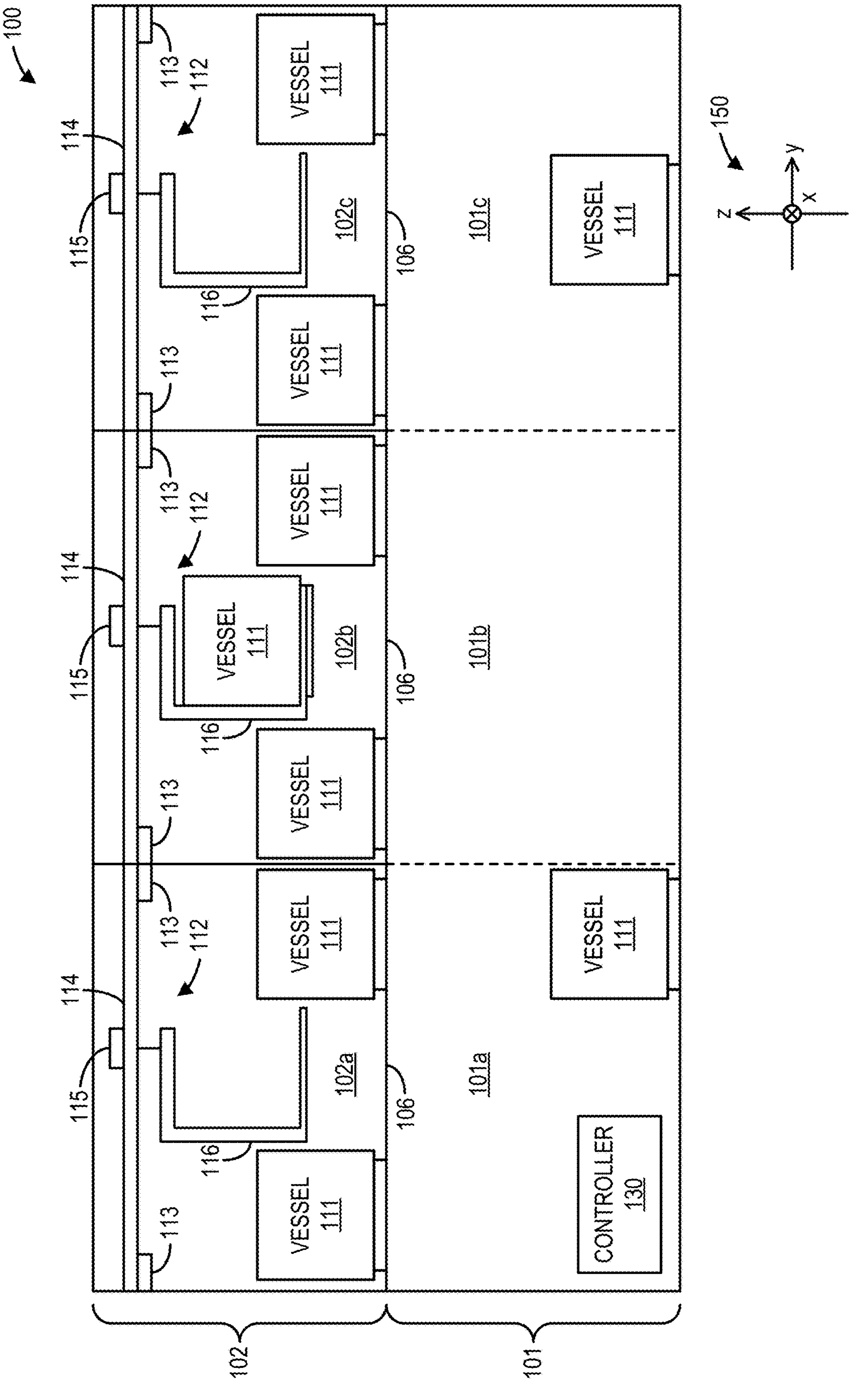
FIG. 2 shows a schematic diagram of the winery of FIG. 1A during the first stage of winemaking, wherein the winery is depicted from another angle than that shown in FIGS. 1A-1D, in accordance with at least one embodiment.

Referring now to FIGS. 1A-2, schematic diagrams of a winery 100 are shown. Specifically, FIGS. 1A-1D depict the winery 100 during respective stages of gravity-assisted winemaking, wherein the winery 100 includes one or more bridge cranes 112, or other overhead crane(s) 112, operable to transfer 152, 153 objects between a lower level 101 of the winery 100 and an upper level 102 of the winery 100, and FIG. 2 depicts the winery 100 during the stage of FIG. 1A from another angle than that shown in FIGS. 1A-1D.

In some embodiments, the upper level 102 may not extend over an entire building footprint of the winery 100 and/or an entire floorspace of the lower level 101. As such, the upper level 102 may include one or more sections which extend over the lower level 101 but do not entirely partition the upper level 102 from the lower level 101. For example, the upper level 102 may include a viewing area 105 (e.g., an upper building story which may not extend over the entire floorspace of the lower level 101 and may include three walls and either an open space where a fourth wall would be positioned or a fourth wall with significant window space) and/or a mezzanine 106 (e.g., an upper building story which may not extend over the entire floorspace of the lower level 101 and which may include three walls and an open space where a fourth wall would be positioned such that the one or more bridges cranes 112 may transfer 152, 153 or otherwise translate 152, 153 objects between the lower level 101 and the mezzanine 106), wherein the viewing area 105 and/or the mezzanine 106 form a ceiling above at least a portion of the lower level 101. Additionally or alternatively, when present, the viewing area 105 and the mezzanine 106 may individually form balconies over the lower level 101, wherein each of the balconies may include a railing 107 or other obstruction to prevent objects or operators from falling from the given balcony. In some embodiments, the viewing area 105 may provide a single vantage point from which a majority or an entirety of the winemaking may be observed. In some embodiments, the mezzanine 106 may, along with the lower level 101, constitute a production space in which various stages of the winemaking actually occur. In some embodiments, the upper level 102 (e.g., the mezzanine 106) may at least entirely cover a storage cellar 117 located on the lower level 101 such that the upper level 102 may form a ceiling of the storage cellar 117. In such embodiments, one or more storage vessels 118, such as one or more barrels 118, may be stored in the storage cellar 117 (e.g., ranging from relatively short durations to relatively long durations, selected based, at least in part, on a quality of a wine being produced and/or a type of the wine).

In an exemplary embodiment, by not extending the upper level 102 over the entire floorspace of the lower level 101, the one or more bridge cranes 112 may have an unobstructed path along which to transfer objects (e.g., materials, vessels, equipment, etc.) between the lower level 101 and the upper level 102 (e.g., the mezzanine 106). One such method for using a bridge crane, such as one of the one or more bridge cranes 112, to transfer objects for gravity-assisted winemaking is discussed in detail below with reference to FIG. 11.

A set of Cartesian coordinate axes 150 is shown in FIGS. 1A-2 for contextualizing positions of the various components of the winery 100. Specifically, x-, y-, and z-axes are provided which are mutually perpendicular to one another, where: the x- and z-axes define a plane of the schematic diagrams shown in FIGS. 1A-1D and the y-axis is perpendicular thereto; and the y- and z-axes define a plane of the schematic diagram shown in FIG. 2 and the x-axis is perpendicular thereto. In some embodiments, a direction of gravity may be parallel to and coincident with a negative direction of the z-axis.

In some embodiments, the winery 100 may be a building or freestanding structure. In additional or alternative embodiments, the winery 100 may be at least partially subterranean, such that at least a portion of walls surrounding the lower level 101 may be below a level of a ground 103. In an exemplary embodiment, the winery 100 may be a bermed structure, e.g., such that at least one side of the lower level 101 may be at ground level and at least one side of the lower level 101 may be beneath ground level. In such embodiments, at least a portion of the upper level 102 (e.g., the mezzanine 106) may be at ground level and may be configured to open onto an outside 104 (e.g., a door may separate the outside 104 from the mezzanine 106).

In some embodiments, the upper level 102 may be a starting position for a stage of gravity-assisted winemaking which involves use of gravity to move material (e.g., grapes, fermentate, wine, etc.). For example, and as shown in FIG. 1A, a crush pad 108 may be positioned on (e.g., received at) the upper level 102 (e.g., the mezzanine 106) such that gravity may be used to assist transfer 151 of grapes (e.g., wine grapes, such as pinot noir grapes) from the upper level 102 to the lower level 101. The crush pad 108 may receive harvested grapes, e.g., from a loading dock or other loading bay located outside 104. In some embodiments, the crush pad 108 may be mobile. For example, the crush pad 108 may include a plurality of wheels 109 such that the crush pad 108 may be movable to and from a given location (e.g., between the outside 104 and the mezzanine 106).

In some embodiments, the crush pad 108 may include a conduit 110*a* (or other passage or channel 110*a*) along which harvested grapes which have been sorted and/or crushed at the crush pad 108 may be transferred into a receiving bin 110*b*. The receiving bin 110*b* may in turn be coupled to a conduit 110*c* (or other passage or channel 110*c*) which uses gravity to assist transfer 151 of the (sorted and/or crushed) grapes to the lower level 101. In certain embodiments, gravity may further be relied upon to assist in destemming of the grapes being transferred 151 along the conduit 110*c* [e.g., the grapes may pass through an automated, semi-automated, or manual destemmer (not shown at FIGS. 1A-2) interposed along the conduit 110*c*]. In such embodiments, the conduit 110*c* may transfer the grapes away from the mezzanine 106 (e.g., along the x- and/or y-axes) and to an area of the lower level 101 which may be exposed to the one or more bridge cranes 112 (also referred to as a blending area).

In some embodiments, the (sorted and/or crushed and/or destemmed) grapes may be transferred 151 to one or more fermentation vessels 111, such as one or more fermentation tanks 111, to be fermented. In certain embodiments described herein, once the grapes are transferred 151 to the one or more fermentation vessels 111 but before the fermentation begins, the grapes may be referred to as processed grapes. Fermentation may take place on one or both of the lower level 101 and the upper level 102 (e.g., the mezzanine 106). In some embodiments, and as shown in FIG. 1A (in which one of the one or more fermentation vessels 111 is shown being transferred 152, 153 by one of the one or more bridge cranes 112) and FIG. 1B (in which three fermentation vessels 111 are shown on the mezzanine 106), at least one of the one or more bridge cranes 112 may be used to transfer 152, 153 the one or more fermentation vessels 111 to the upper level 102 (e.g., the mezzanine 106).

In some embodiments, each of the one or more bridge cranes 112 may include a pair of runway rails 113 which extend (e.g., along the x-axis) across an entire, or substantially an entire, production space of the winery 110. The pair of runway rails 113 may each support an orthogonally extending (e.g., along the y-axis) pair of bridge rails 114 which support a girder 115. Accordingly, in such embodiments, the girder 115 may be permitted free (e.g., unobstructed) movement along two orthogonal axes: the pair of runway rails 113 may provide movement along one axis (e.g., the x-axis) and the pair of bridge rails 114 may provide movement along another, orthogonal axis (e.g., the y-axis), such that the girder 115 may assume substantially any position (e.g., any x, y position) in a rectangle defined by lengths of the runway and bridge rails 113, 114. In some embodiments, the girder 115 of each of the one or more bridge cranes 112 may be operable to lift/raise and lower (e.g., along the z-axis) a load support (exemplified in FIGS. 1A-2 as a platform 116 or a hook 124) and, when present, a load. As such, the one or more bridge cranes 112 may be operable to: transfer 152 objects vertically (e.g., along the z-axis) between the lower level 101 and the upper level 102; and transfer 153 objects horizontally (e.g., along the x- and/or y-axes) within the lower level 101 or within the upper level 102 (depending on where the load of a given bridge crane 112 is located). Horizontal and vertical limits in which a given bridge crane 112 of the one or more bridge cranes 112 may translate object(s) may be represented as line segments defining dimensions of a rectangular prism which delimits a volume in which the object(s) (e.g., suspended from the girder 115 of the given bridge crane 112) are translatable.

In some embodiments, and as described in greater detail below and with reference to FIGS. 3A-7 and 12, a ballasted punch down device 121 may be transferred 152, 153 using the one or more bridge cranes 112. For example, and as shown in FIG. 1B, the ballasted punch down device 121 may be lifted and lowered (e.g., along the z-axis) by the one or more bridge cranes 112 into and out of the one or more fermentation vessels 111. One such method for using a bridge crane, such as one of the one or more bridge cranes 112, to position a ballasted punch down device, such as the ballasted punch down device 121, for pigeage is discussed in detail below with reference to FIG. 12.

Figure 3A:
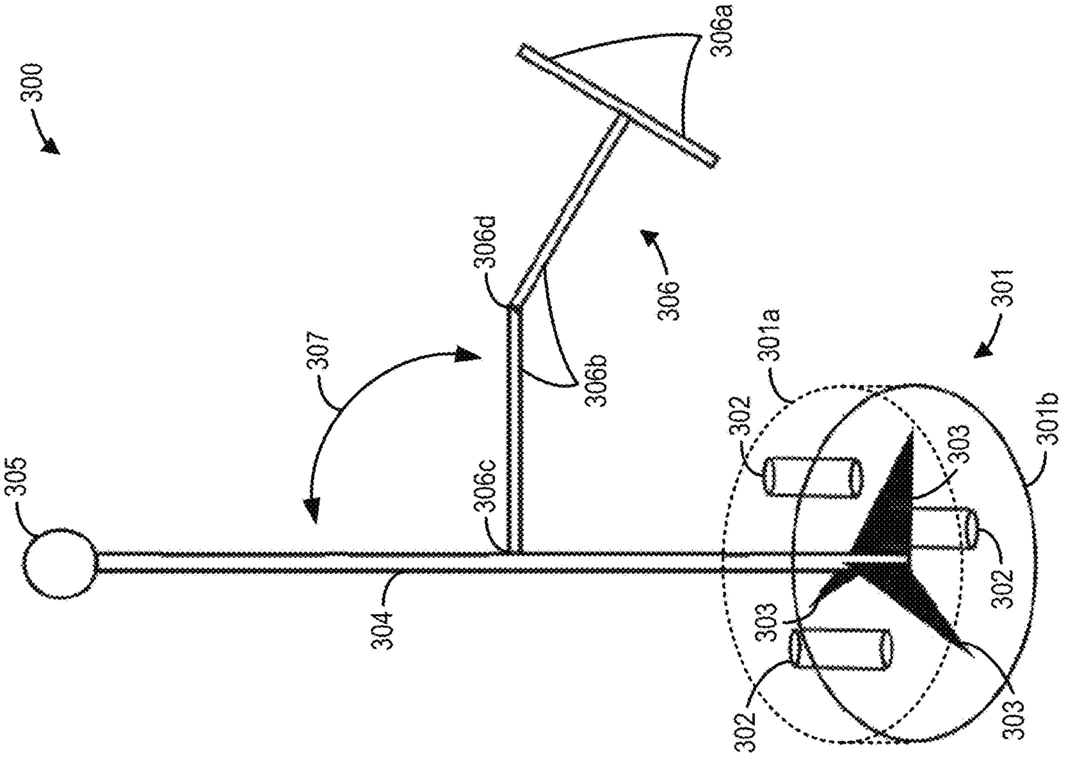
FIG. 3A shows a perspective view of a punch down device adapted to enclose a ballast, wherein an upper portion of a cylindrical housing of the punch down device is depicted in dashing, in accordance with at least one embodiment.
Figure 3B:
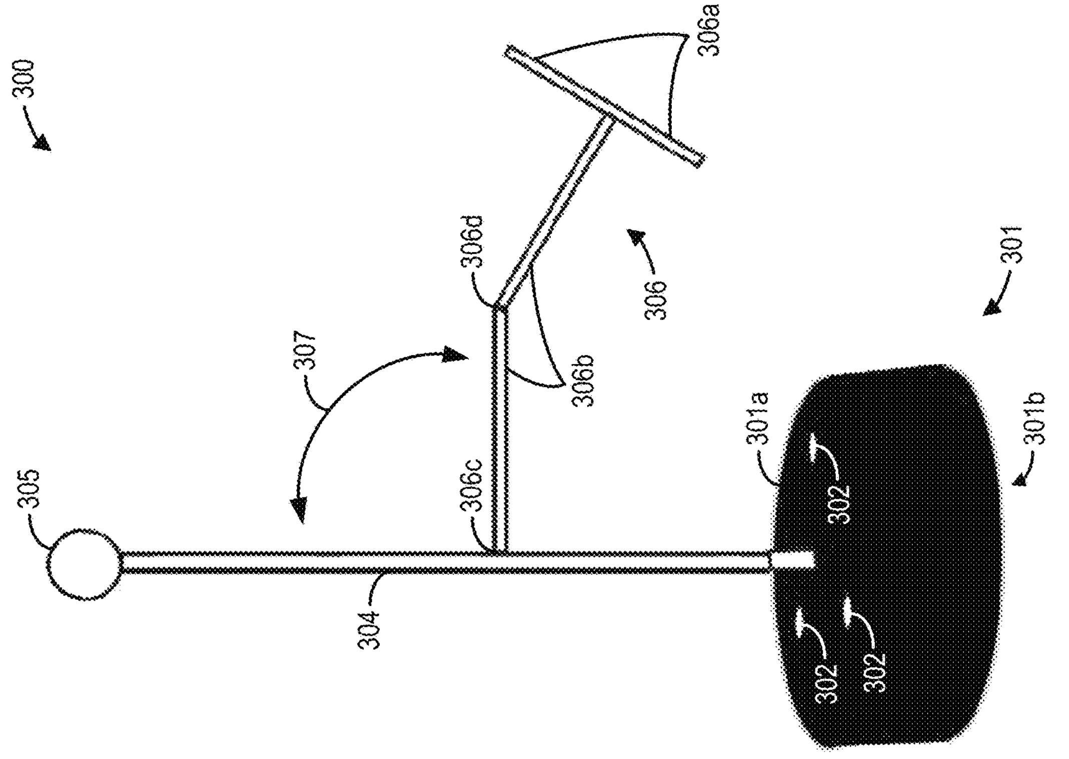
FIG. 3B shows a perspective view of the punch down device of FIG. 3A, in accordance with at least one embodiment.
Figure 4B:
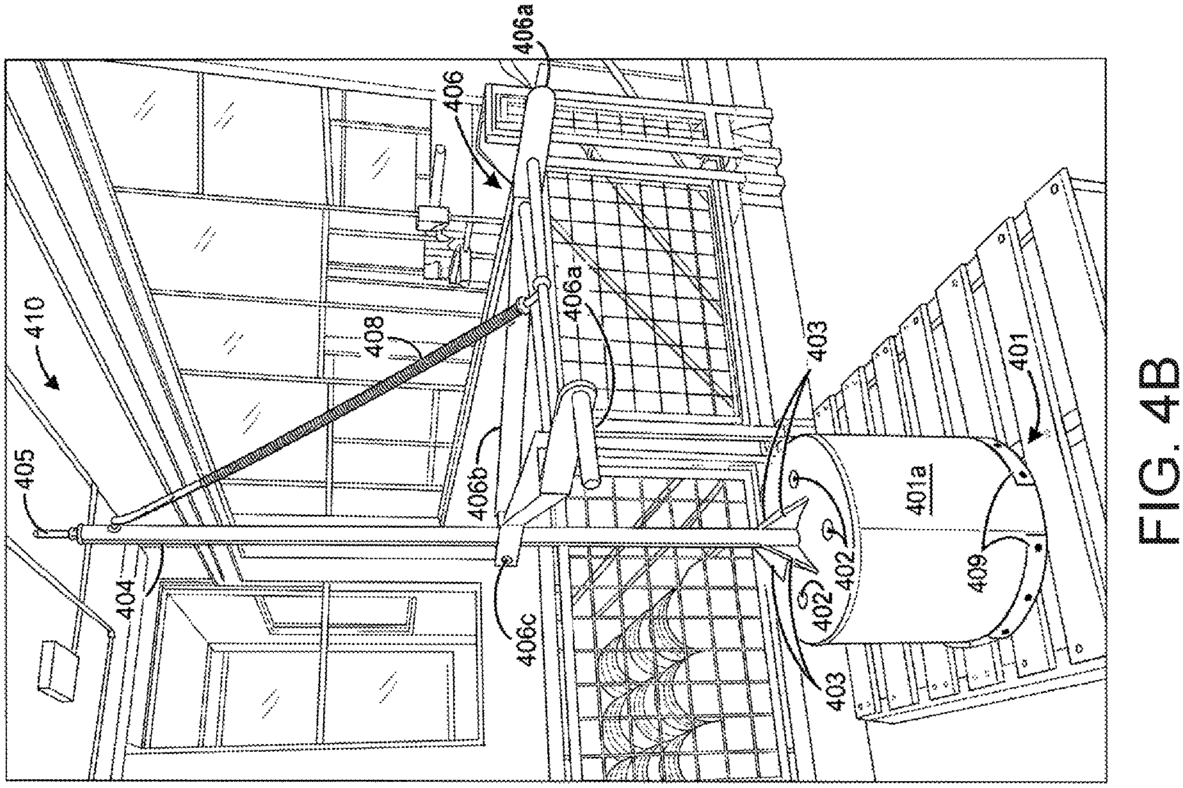
FIGS. 4A and 4B show perspective views of a ballasted punch down device, in accordance with at least one embodiment.
Figure 4A:
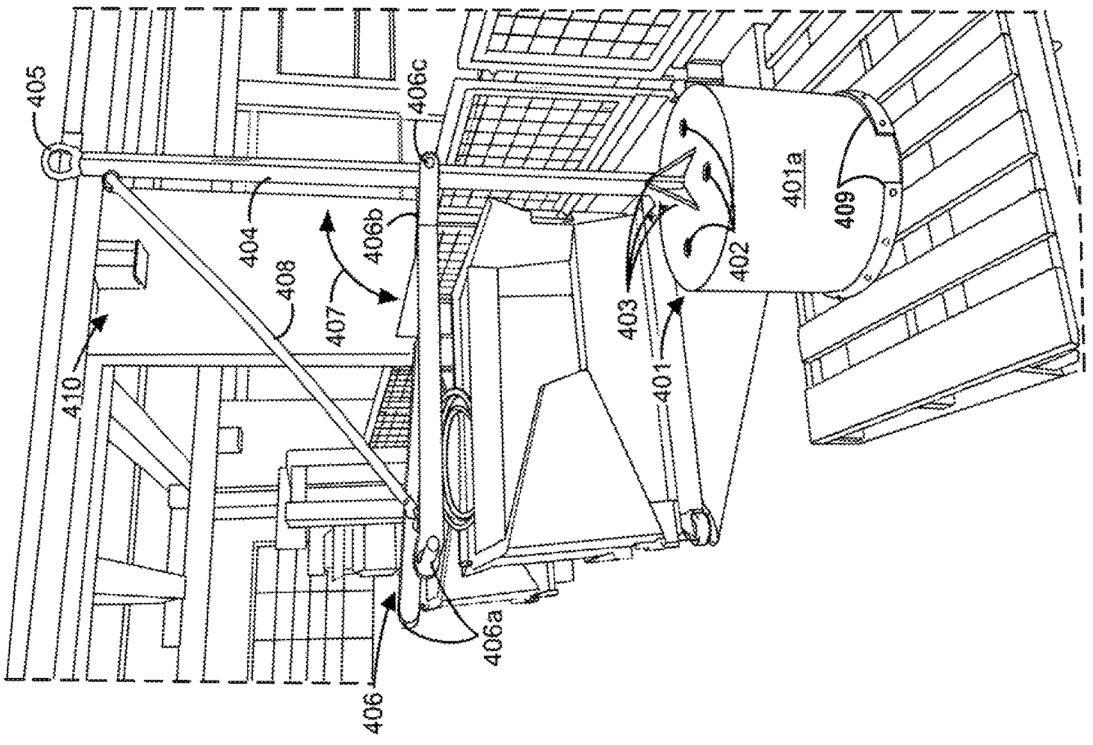
Figures 5A, 5B:
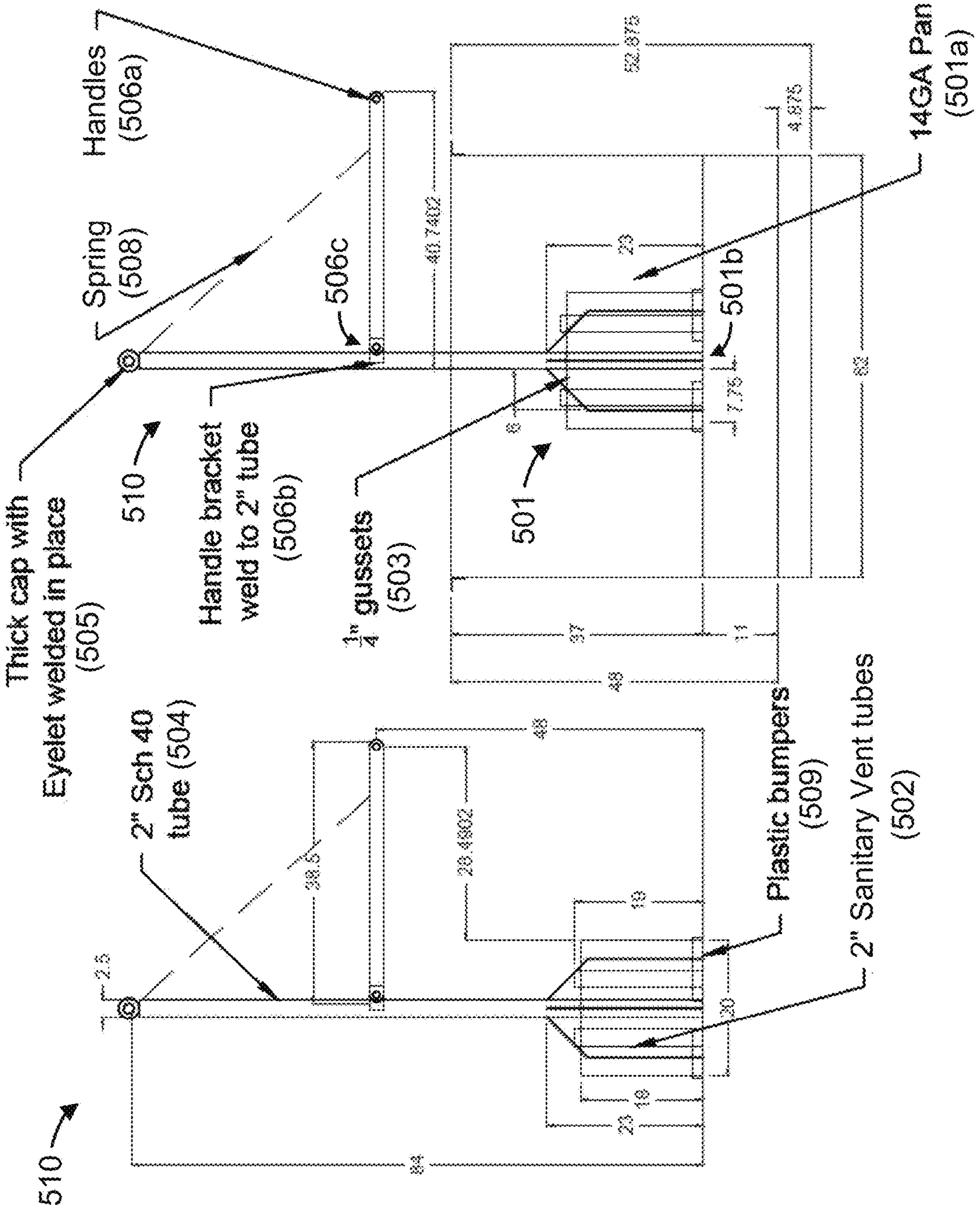
FIGS. 5A and 5B show schematic cross-sectional views of a ballasted punch down device, including exemplary dimensions of the ballasted punch down device, in accordance with at least one embodiment.
Figure 6:
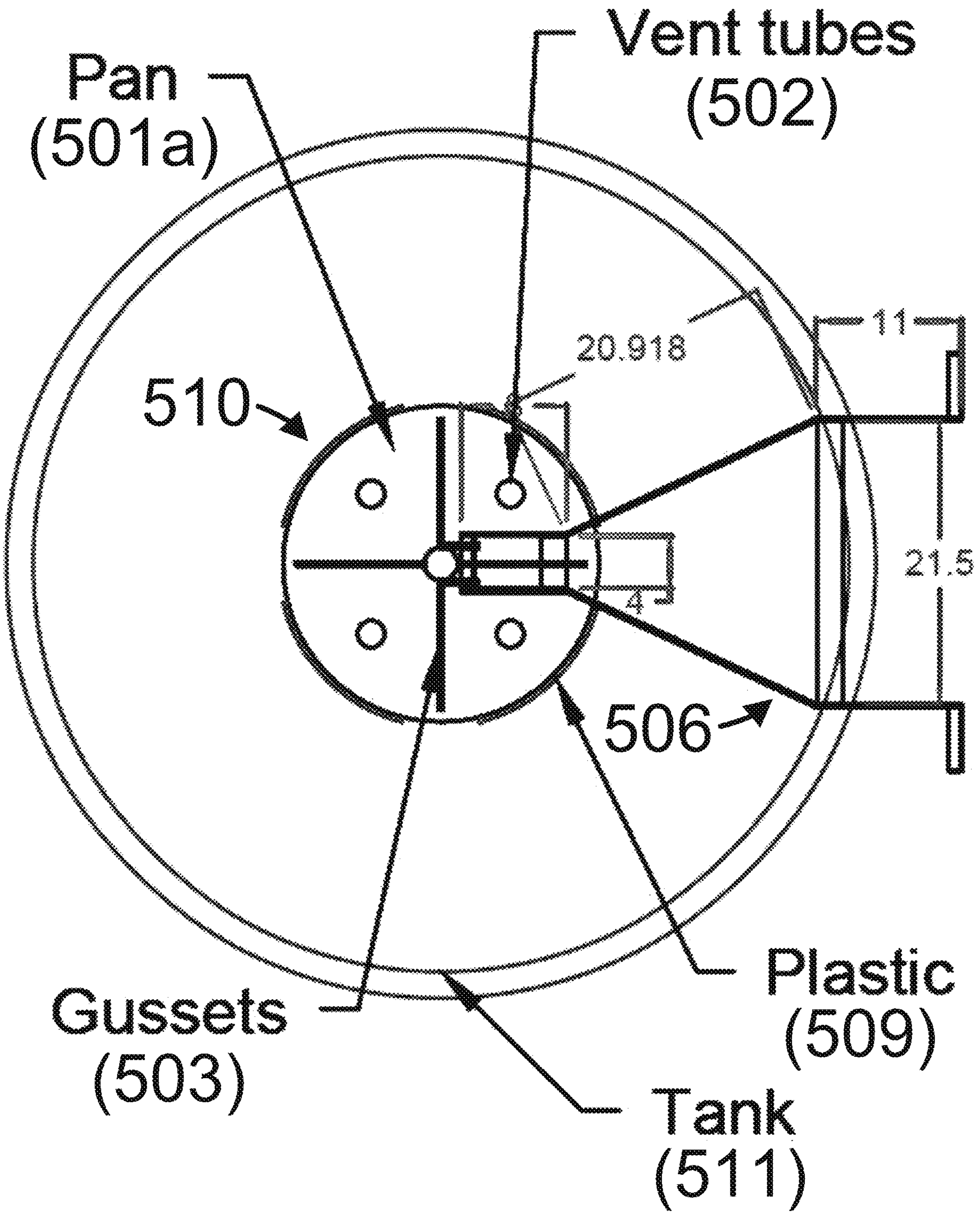
FIG. 6 shows a schematic top view of the ballasted punch down device of FIGS. 5A and 5B positioned over a vessel, including exemplary dimensions of the ballasted punch down device and a positioning thereof relative to the vessel, in accordance with at least one embodiment.
Figure 7:
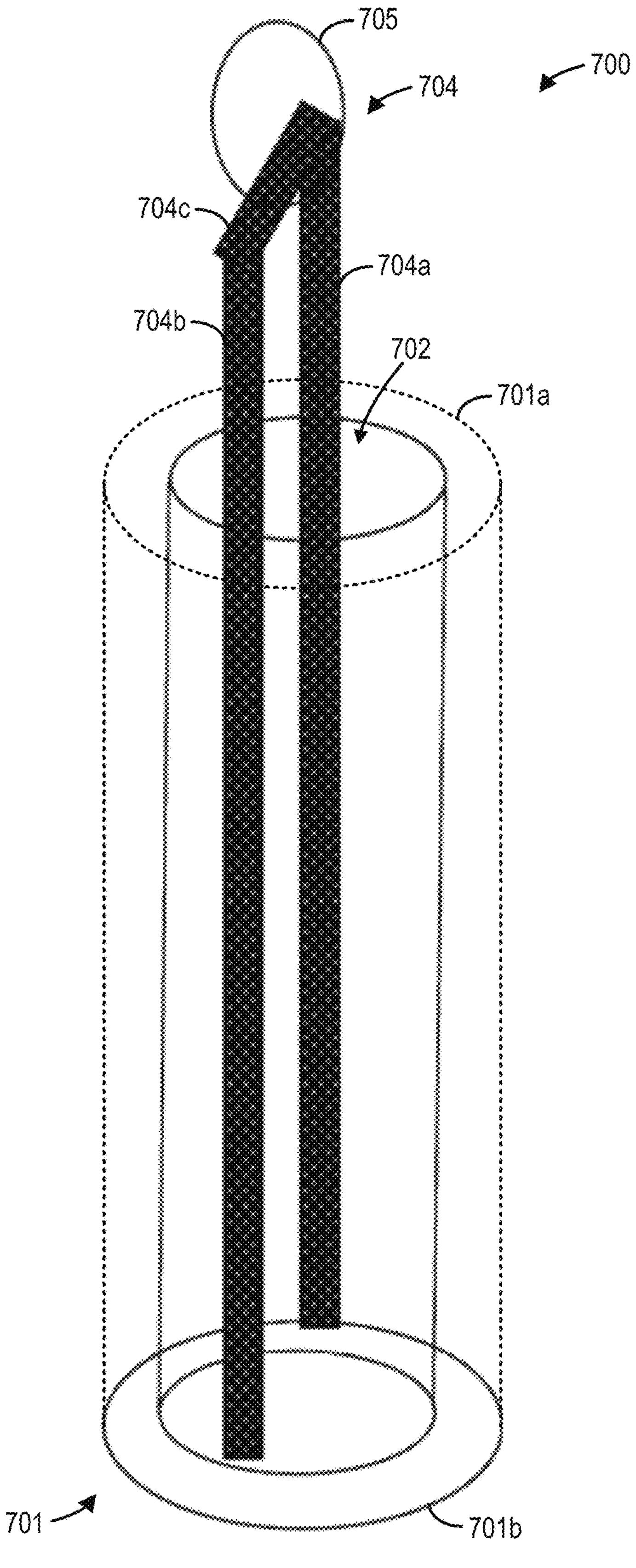
FIG. 7 shows a perspective view of a punch down device adapted to enclose a ballast, wherein an outer portion of an annular housing of the punch down device is depicted in dashing, in accordance with at least one embodiment.

The ballasted punch down device 121 is depicted schematically in FIG. 1B and may be embodied as any one or more of the punch down devices described herein with reference to FIGS. 3A-7. For example, FIGS. 3A and 3B depict perspective views of a punch down device adapted to enclose a ballast and FIGS. 4A and 4B depict perspective views of such a punch down device enclosing such a ballast. FIGS. 5A-6 provide exemplary dimensions of a ballasted punch down device, including relative positioning of the ballasted punch down device in relation to a vessel. FIG. 7 depicts a perspective view of another embodiment of a punch down device adapted to enclose a ballast.

During the fermentation, a cap of solids 120 may separate from and float on top of a fermentate 119 (e.g., induced upwards and buoyed, at least in part, by $CO_2$ evolving during the fermentation). The ballasted punch down device 121, when submerged within the fermentation vessel 111, may perform pigeage by disturbing or otherwise disrupting the cap of solids 120 (e.g., such that maceration of the cap of solids 120 may be increased). The ballasted punch down device 121 may be biased downwards by a ballast 122, which restricts horizontal movement (e.g., along the x- and/or y-axes) and provides downward force for submerging the ballasted punch down device within the fermentation vessel 111. In an exemplary embodiment, the ballast 122 may be formed from concrete. However, any sufficiently heavy and/or dense material (e.g., rocks, cement, etc.) containable within a housing of the ballasted punch down device 121 may form the ballast 122. In an exemplary embodiment, the ballast 122 may be sufficiently heavy if, when the ballasted punch down device 121 is lowered into the fermentation vessel 111, an amount of pressure applied to the fermentate 119 and the cap of solids 120 is equal to at least 0.1 psi for each 15 cubic inches of fermentate 119 and the cap of solids 120. In some embodiments, the ballasted punch down device 121 may include an extension 123 which may permit at least some manual control of the ballasted punch down device 121 (e.g., for precision adjustments to a horizontal position thereof, such as when the ballasted punch down device 121 is not fully positioned over the fermentation vessel 111). The extension 123 may be outwardly extendable beyond the fermentation vessel 111, e.g., for ease of handling.

In some embodiments, following the fermentation, gravity may be relied upon to assist in draining and pressing of the fermentate 119. For example, and as shown in FIG. 1C, once transferred 152, 153 to the upper level 102 (e.g., the mezzanine 106), the one or more fermentation vessels 111 may be coupled (e.g., one at a time simultaneously) to one or more drainage conduits 125 [or other drainage passage(s) or channel(s) 125] and/or one or more pressing conduits 126 [or other pressing passage(s) or channel(s) 126] such that the fermentate 119 may be transferred 154 along the one or more drainage conduits 125 and/or the one or more pressing conduits 126. In certain embodiments, gravity may be relied upon to assist in draining a first portion of the fermentate 119 along the one or more drainage conduits 125 and/or pressing a second portion of the fermentate 119 through a press 127 interposed along the one or more pressing conduits 126. In such embodiments, the one or more drainage conduits 125 and/or the one or more pressing conduits 126 may transfer the grapes away from the mezzanine 106 (e.g., along the x- and/or y-axes) and to the area of the lower level 101 which may be exposed to the one or more bridge cranes 112.

In some embodiments, at least a portion of the (drained and/or pressed) fermentate 119 may be transferred 154 to one or more settling vessels 128, such as one or more settling tanks 128, to be settled. Settling may take place on one or both of the lower level 101 and the upper level 102 (e.g., the mezzanine 106). In some embodiments, and as shown in FIG. 1C (in which one of the one or more settling vessels 128 is shown being transferred 152, 153 by one of the one or more bridge cranes 112) and FIG. 1D (in which three settling vessels 128 are shown on the mezzanine 106), at least one of the one or more bridge cranes 112 may be used to transfer 152, 153 the one or more settling vessels 128 to the upper level 102 (e.g., the mezzanine 106).

In some embodiments, during or following the settling, gravity may be relied upon to assist in barreling the (settled) fermentate 119. For example, and as shown in FIG. 1D, once transferred 152, 153 to the upper level 102 (e.g., the mezzanine 106), the one or more settling vessels 128 may be coupled (e.g., one at a time or simultaneously) to one or more conduits 129 [or other passage(s) or channel(s) 129] such that the (settled) fermentate 119 may be transferred 155 along the one or more conduits 129. In certain embodiments, gravity may be relied upon to assist in transferring 155 the (settled) fermentate 119 along the one or more conduits 129 to the one or more storage vessels 118 to be barreled or otherwise stored. In such embodiments, the one or more conduits 129 may transfer the (settled) fermentate 119 underneath the mezzanine 106 (e.g., along the z-axis) and to an area of the lower level 101 which may not be exposed to the one or more bridge cranes 112. In other embodiments, the one or more storage vessels 118 may be stored in the area of the lower level 101 which may be exposed to the one or more bridge cranes (that is, not in the storage cellar 117).

In some embodiments, the winery 100 may be partitioned into multiple production or blending areas, which may or may not be physically partitioned. In such embodiments, the one or more bridge cranes 112 may include a plurality of bridge cranes 112, wherein each bridge crane 112 of the plurality of bridge cranes 112 may operate in a corresponding pair of production areas: one on the lower level 101 and one on the upper level 102. For example, and as shown in FIG. 2, the winery 100 may include a plurality of lower production areas 101*a*, 101*b*, 101*c* and a plurality of upper production areas 102*a*, 102*b*, 102*c*. In some embodiments, the plurality of lower production areas 101*a*, 101*b*, 101*c* and/or the plurality of upper production areas 102*a*, 102*b*, 102*c* may not be physically partitioned and may each instead be defined based on a space in which a respective bridge crane 112 may operate (in FIG. 2, for example, the plurality of lower production areas 101*a*, 101*b*, 101*c* are not physically partitioned from one another). In some embodiments, the plurality of lower production areas 101*a*, 101*b*, 101*c* and/or the plurality of upper production areas 102*a*, 102*b*, 102*c* may be physically partitioned, e.g., by a wall (in FIG. 2, for example, the plurality of upper production areas 102*a*, 102*b*, 102*c* are physically partitioned from one another).

In some embodiments, each given pair of lower and upper production areas (e.g., production areas 101*a* and 102*a*, production areas 101*b* and 102*b*, production areas 101*c* and 102*c*) in which a given bridge crane 112 of the plurality of bridge cranes 112 operates may be configured such that an entire winemaking process may be performed within the given pair of lower and upper production areas. Accordingly, in certain embodiments, a same bridge crane 112 of the plurality of bridge cranes 112 may be used to lift the one or more fermentation vessels 111 and the one or more settling vessels 128, e.g., for a pair of lower and upper production areas in which the bridge crane 112 operates. In other embodiments, each bridge crane 112 of the plurality of bridge cranes 112 may be utilized to perform a different stage or subset of stages of the winemaking process. In some embodiments, each bridge crane 112 of the plurality of bridge cranes 112 may be simultaneously operable to transfer 152, 153 objects (e.g., materials, vessels, equipment, etc.). In additional or alternative embodiments, each bridge crane 112 of the plurality of bridge cranes 112 includes: a runway rail 113 which is parallel to a runway rail 113 of each other bridge crane 112 of the plurality of bridge cranes 112 (and to the x-axis); and/or a bridge rail 114 which is parallel to a bridge rail 114 of each other bridge crane 112 of the plurality of bridge cranes 112 (and to the y-axis).

In some embodiments, a controller 130, or other computing device 130, including non-transitory memory on which executable instructions may be stored, may be utilized at, or in connection with, the winery 100. The executable instructions may be executed by one or more processors of the controller 130 to perform steps of a winemaking process, e.g., by commanding certain functionalities of various components of the winery 100. Accordingly, the executable instructions may include various routines for operation and maintenance of the various components of the winery 100. Specifically, the controller 130 may be communicably coupled to the various components of the winery 100 to command actuation and use thereof (wired and/or wireless communication paths between the controller 130 and the various components of the winery 100 are omitted from FIGS. 1A-2 for clarity). For instance, the controller 130 may command actuation of various operations (e.g., lowering and lifting of the load) and movements (e.g., of the girder 115 along the runway rails 113 and the bridge rails 114) of each of the one or more bridge cranes 112.

In some embodiments, the controller 130 may be configured for use by an operator. As such, the controller 130 may include a user interface at which the operator may enter commands or otherwise modify operation of the various components of the winery 100. The user interface may include various components for facilitating operator use of the controller 130 and for receiving operator inputs (e.g., requests to adjust a position of the girder 115 of each of the one or more bridge cranes 112), such as one or more displays, input devices (e.g., keyboards, touchscreens, computer mice, depressible buttons, mechanical switches, other mechanical actuators, etc.), lights, etc.

Figure 11:
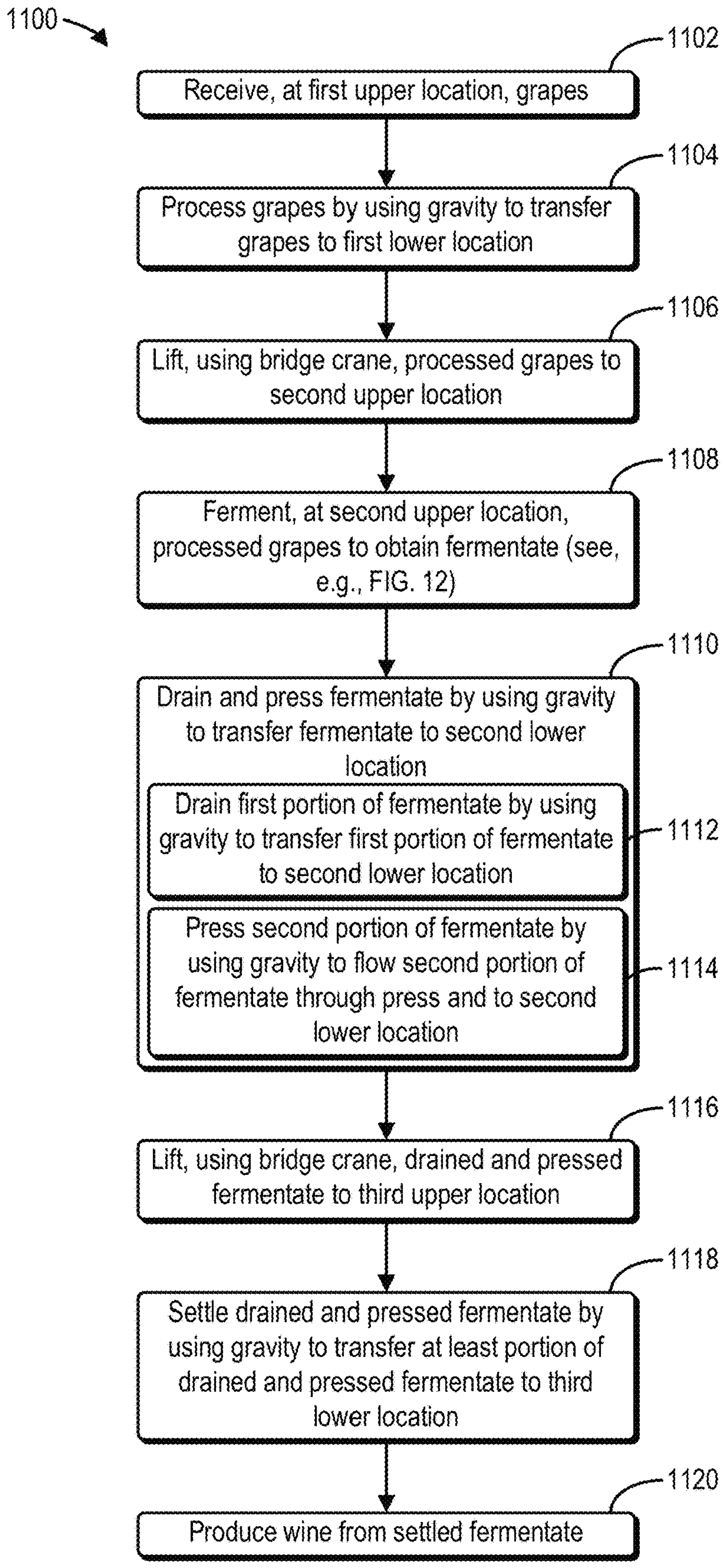
FIG. 11 shows a block diagram of a method for gravity-assisted winemaking, including using a bridge crane to transfer objects between lower locations of a winery and upper locations of the winery, in accordance with at least one embodiment.

Referring now to FIG. 11, a block diagram of a method 1100 for gravity-assisted winemaking is shown. In some embodiments, at least some stages of the gravity-assisted winemaking rely, at least in part, on using gravity to transfer material from upper locations of a winery (e.g., on an upper level of the winery) to lower locations of the winery (e.g., on a lower level of the winery). For example, a bridge crane may be implemented in the winery and used to transfer objects from the lower locations to the upper locations (e.g., after gravity has been used to assist in transfer of material from the upper locations to the lower locations). As such, a same drop in elevation (e.g., between the lower and upper locations) may be relied upon for each stage assisted, at least in part, by gravity. In additional or alternative embodiments, and as described in greater detail below with reference to FIG. 12, the bridge crane may be integrated into various stages of the gravity-assisted winemaking, such as in pigeage during a fermentation process.

In some embodiments, the method 1100, or a portion thereof, may be implemented as executable instructions stored in non-transitory memory of a computing device, such as a controller communicably coupled to the one or more bridge cranes. However, though the method 1100 is described below, by way of example, as an ordered sequence of steps, embodiments of methods for gravity-assisted winemaking are not limited to the below description of the method 1100. For instance, in certain embodiments, additional or alternative sequences of steps may be implemented, e.g., as executable instructions on such a computing device, where individual steps discussed with reference to the method 1100 may be added, removed, substituted, modified, or interchanged.

At block 1102, the method 1100 may include receiving, at a first upper location, grapes. In some embodiments, the first upper location may be located on the upper level of the winery. In an exemplary embodiment, the upper level may not extend over an entire floorspace of the winery. In such embodiments, at least one side of the upper level may not be enclosed by a wall, such that the upper level may be exposed to (an open) space above the lower level, e.g., for transferring materials between the lower and upper levels. For example, the upper level may be a mezzanine which opens onto the lower level or may otherwise form a balcony over the lower level. In some embodiments, at least a portion of each of the lower and upper levels of the winery (e.g., an entirety of the lower and upper levels, a portion of the lower and upper levels dedicated to wine production, a portion of the lower and upper levels which form an open space, etc.) may be visible from a single vantage point. In an exemplary embodiment, each of the upper and lower locations at which the gravity-assisted winemaking takes place may be visible from the single vantage point. In some embodiments, the grapes may be received at a crush pad. The crush pad may be mobile (e.g., via a plurality of wheels), such that the grapes may be loaded into the crush pad outside of the winery (e.g., after being harvested from a vineyard) and transferred inside the winery on the crush pad to the first upper location. In an exemplary embodiment, the grapes may be usable to produce a red wine. For example, the grapes may include pinot noir grapes (e.g., substantially all of the processed grapes may be pinot noir grapes). In at least one embodiment, the receiving may include receiving the grapes from an estate or other complex encompassing or otherwise associated with the winery (e.g., via a tractor and/or three-bin trailer) or from elsewhere (e.g., up to 20 bins from an off-site vineyard), weighing in the grapes, and storing the grapes overnight and/or for a shorter duration.

At block 1104, the method 1100 may include processing the grapes by, at least in part, using gravity to transfer the grapes to a first lower location (e.g., from the first upper location). In some embodiments, the first lower location may be located on the lower level of the winery. In some embodiments, since the grapes may be harvested from a vineyard, the grapes may include excess material which may not be usable in winemaking. Accordingly, the (harvested) grapes may be processed, which may include sorting and/or destemming of the grapes. In an exemplary embodiment, the sorting and/or the destemming may be assisted by gravity, such that the grapes may be sorted and/or destemmed upon reaching the first lower location. In some embodiments, the grapes may be transferred from the upper level to the lower level via one or more passages which transfer the grapes away from the upper level and to an area of the lower level which may not be exposed to the bridge crane. In some embodiments, the (processed) grapes may be received at a fermentation vessel (e.g., of one or more fermentation vessels).

At block 1106, the method 1100 may include lifting, using a bridge crane, the processed grapes (e.g., in the fermentation vessel) to a second upper location (e.g., from the first lower location). In some embodiments, the second upper location may be located on the upper level of the winery. In additional or alternative embodiments, the second upper location may be a same location as the first upper location (e.g., the crush pad previously occupying the first upper location may have been moved to create space for the processed grapes). In some embodiments, the bridge crane may be one of one or more bridge cranes included in the winery.

At block 1108, the method 1100 may include fermenting, at the second upper location, the processed grapes (e.g., in the fermentation vessel) to obtain a fermentate. In some embodiments, the fermentation may be entirely performed at the second upper location. In other embodiments, the fermentation may be initiated at the first lower location and finished at the second upper location. In some embodiments, the fermentation may include punching down a cap of grape solids formed from the processed grapes [e.g., above the (liquid) fermentate] during the fermentation. In at least one such embodiment, and as described in detail below with reference to FIG. 12, the punching down may be performed by using a punch down device suspended from the bridge crane. In at least one embodiment, the fermentation may include cold soaking the processed grapes, warming/inoculating the cold soaked grapes, punching down a resultant cap of grape solids, and pumping (e.g., grape must) over the cap of grape solids.

At block 1110, the method 1100 may include draining and pressing the fermentate by, at least in part, using gravity to transfer the fermentate to a second lower location (e.g., from the second upper location). In some embodiments, the second lower location may be located on the lower level of the winery. In additional or alternative embodiments, the second lower location may be a same location as the first lower location (e.g., the fermentation vessel previously occupying the first lower location may have been moved to create space for the drained and pressed fermentate). In some embodiments, the draining and the pressing may be performed in sequence (e.g., the draining before the pressing or vice versa). In other embodiments, the draining and the pressing may be performed substantially simultaneously. Specifically, at block 1112, the method 1100 may include draining a first portion of the fermentate by, at least in part, using gravity to transfer the first portion of the fermentate to the second lower location (e.g., from the second upper location). In sequence or in tandem with the draining, at block 1114, the method 1100 may include pressing a second portion of the fermentate by, at least in part, using gravity to flow the second portion of the fermentate through a press and to the second lower location (e.g., from the second upper location). In an exemplary embodiment, the draining and the pressing may be assisted by gravity, such that the first and second portions of the fermentate may be drained and pressed upon reaching the second lower location. In some embodiments, the first and second portions of the fermentate may be transferred from the upper level to a lower level via one or more passages which transfer the first and second portions of the fermentate away from the upper level and to the area of the lower level which may not be exposed to the bridge crane. After the draining and the pressing, the first and second portions of the fermentate may be collectively referred to as the drained and pressed fermentate. In some embodiments, the drained and pressed fermentate may be received at a settling vessel (e.g., of one or more settling vessels).

At block 1116, the method 1100 may include lifting, using the bridge crane, the drained and pressed fermentate to a third upper location (e.g., from the second lower location). In some embodiments, the third upper location may be located on the upper level of the winery. In additional or alternative embodiments, the third upper location may be a same location as the first upper location and/or the second upper location (e.g., the crush pad previously occupying the first upper location and/or the fermentation vessel previously occupying the second upper location may have been moved to create space for the drained and pressed fermentate).

At block 1118, the method 1100 may include settling (at least a portion of) the drained and pressed fermentate by, at least in part, using gravity to transfer at least a portion of the drained and pressed fermentate to a third lower location (e.g., from the third upper location). In some embodiments, the third lower location may be located on the lower level of the winery. In additional or alternative embodiments, the third lower location may be a same location as the first lower location and/or the second lower location (e.g., the fermentation vessel previously occupying the first lower location and/or the settling vessel previously occupying the second lower location may have been moved to create space for the drained and pressed fermentate). In some embodiments, the third lower location may be located underneath the upper level, such that the upper level may form a ceiling above the third lower location. In at least one such embodiment, the third lower location may be within a storage cellar. In some embodiments, the settling may be entirely performed at the third upper location. In other embodiments, the settling may be initiated at the second lower location and finished at the third upper location. In some embodiments, the settling may include separating a first portion of the drained and pressed fermentate from a second portion of the drained and pressed fermentate, the first portion of the drained and pressed fermentate having a lower content of solids than the second portion of the drained and pressed fermentate. In an exemplary embodiment, the settling may be assisted by gravity, such that the first portion of the drained and pressed fermentate may be settled out of the drained and pressed fermentate upon reaching the third lower location. In some embodiments, the first portion of the drained and pressed fermentate may be transferred from the upper level to the lower level via one or more passages which transfer the first portion of the drained and pressed fermentate away from the upper level and to an area of the lower level which may not be exposed to the bridge crane. In some embodiments, the settled fermentate (e.g., the first portion of the drained and pressed fermentate) may be received at a storage vessel (e.g., of one or more storage vessels).

At block 1120, the method 1100 may include producing a wine from the settled fermentate. In some embodiments, the settled fermentate may be moved from the third lower location (e.g., removed from the storage vessel) to produce the wine. In an exemplary embodiment, the wine may be a red wine, such as a wine produced, at least in part, from pinot noir grapes. In at least one embodiment, the wine production may include racking the settled fermentate from the storage vessel (e.g., assisted by nitrogen and/or argon), cleaning the storage vessel, storing the storage vessel (e.g., for future use), back blending and/or filtering the settled fermentate, and bottling a resultant wine.

Referring now to FIGS. 3A and 3B, perspective views of a punch down device 300 adapted to enclose a ballast is shown. In FIG. 3A, an upper portion 301*a* of a cylindrical housing 301 of the punch down device 300 is depicted in dashed lines, while in FIG. 3B, the upper portion 301*a* is depicted in solid lines. In an exemplary embodiment, the punch down device 300, when configured with the ballast (not shown at FIGS. 3A and 3B), may be suspended from a bridge crane, such as one of the one or more bridge cranes 112 described in detail above with reference to FIGS. 1A-2, so as to perform pigeage.

In some embodiments, the cylindrical housing 301 of the punch down device 300 may include the upper portion 301*a* and a lower portion 301*b*. In an example embodiment, the cylindrical housing 301 may be formed from stainless steel. However, any sufficiently non-contaminating material may be used to form the cylindrical housing 301. In some embodiments, a base of the cylindrical housing 301 (e.g., either base of a cylinder which at least approximates a shape of the cylindrical housing 301, such as a substantially circular surface of the upper portion 301*a* or the lower portion 301*b*) may have a radius of 5 to 15 inches.

In some embodiments, the cylindrical housing 301 may enclose a ballast. In such embodiments, the ballast may be hermetically sealed within the cylindrical housing 301 (e.g., such that the ballast may not contaminate a fermentate in a fermentation vessel in which the punch down device 300 may be submerged). For example, the upper portion 301*a* may be sealed to the lower portion 301*b* with an epoxy. In an example embodiment, the ballast may be formed from concrete. However, any sufficiently heavy and/or dense material (e.g., rocks, cement, etc.) containable within the cylindrical housing 301 may be used to form the ballast. In an example embodiment, the cylindrical housing 301 may have a volume of up to 325 cubic inches so as to accommodate such a sufficiently heavy ballast.

In some embodiments, the punch down device 300 may include one or more apertures 302, the one or more apertures 302 extending between bases of the cylindrical housing 301 (e.g., substantially circular portions of the upper portion 301*a* and the lower portion 301*b*). Accordingly, in certain embodiments, the ballast may be annular or may include corresponding aperture(s) for the one or more apertures 302, such that the ballast may circumscribe the one or more apertures 302. In an exemplary embodiment, the one or more apertures 302 may function as vents when the punch down device 300 is used to perform pigeage (e.g., such that at least a portion of a cap of grape solids and at least a portion of a fermentate in a fermentation vessel in which the punch down device 300 may be submerged may freely pass through the one or more apertures 302). In some embodiments, each of the one or more apertures 302 may be cylindrical in shape. However, various other shapes (e.g., trigonal prisms, rectangular prisms, etc.) of aperture(s) 302 may suffice in certain embodiments described herein. In some embodiments, the one or more apertures 302 may include a plurality of symmetrically distributed apertures 302 (e.g., to provide even venting during pigeage). In some embodiments, the one or more apertures 302 may (collectively) occupy less than ⅙ of an area of either of the bases of the cylindrical housing 301.

In some embodiments, the punch down device 300 may include a plurality of gussets 303 and a central extension 304, the plurality of gussets 303 supporting a central extension 304 extending upwardly from the lower portion 301*b*. In some embodiments, and as shown in FIGS. 3A and 3B, the plurality of gussets 303 may not extend above the upper portion 301*a*. In other embodiments, the plurality of gussets 303 may extend from the lower portion 301*b* and above the upper portion 301*a* (see, e.g., FIGS. 5A and 5B). In still other embodiments, the plurality of gussets 303 may extend from the upper portion 301*a*, rather than from the lower portion 301*b* (see, e.g., FIGS. 4A and 4B). In some embodiments, the plurality of gussets 303 may be symmetrically distributed (e.g., to provide even support of the central extension 304).

In some embodiments, the central extension 304 may extend between the lower portion 301*b* and a shackle 305 of the punch down device 300. In an exemplary embodiment, the shackle 305 may be annular. However, various other configurations (e.g., hooks, locking elements, etc.) of shackles 305 may suffice in certain embodiments described herein. In at least one embodiment, the shackle 305 may be used to suspend the punch down device 300 from a support (e.g., a load support of a bridge crane).

In some embodiments, the punch down device 300 may include a manual extension 306. In an exemplary embodiment, the manual extension 306 may include one or more handles 306*a* (e.g., configured to be gripped or otherwise manipulated by an operator such that a position of the punch down device 300 may be adjusted, such as over a fermentation vessel, over a portion of the fermentation vessel in which a cap of grape solids floats, etc.), one or more rods 306*b*, and one or more hinges or joints 306*c* (e.g., handle brackets) coupling the one or more rods 306*b* to one another and/or the central extension 304 and/or the one or more handles 306*a*. In some embodiments, the manual extension 306 may extend outwardly from the central extension 304 (e.g., such that the position of the punch down device 300 may be more easily adjusted by an operator). In an exemplary embodiment, the manual extension 306 may be adjustable between a first position in which the manual extension 306 is not extended (e.g., wherein the manual extension 306 may be folded towards the central extension 304 such that the manual extension 306 is parallel or nearly parallel with the central extension 304) and a second position in which the manual extension 306 is extended (e.g., wherein the manual extension 306 may be unfolded outwards such that the manual extension is perpendicular or nearly perpendicular with the central extension 304). In FIGS. 3A and 3B, an exemplary adjustment between the first and second positions is indicated with a bidirectional arrow 307.

Referring now to FIGS. 4A and 4B, perspective views of a ballasted punch down device 410 are shown. In an exemplary embodiment, the ballasted punch down device 410 may be suspended from a bridge crane, such as one of the one or more bridge cranes 112 described in detail above with reference to FIGS. 1A-2, so as to perform pigeage. In at least one embodiment, the ballasted punch down device 410 may be assembled and configured similarly to the punch down device 300 of FIGS. 3A and 3B (that is, when a ballast is enclosed by the punch down device 300) and may operate in a substantially similar manner in practice. Accordingly, in certain embodiments, the description provided above with reference to FIGS. 3A and 3B may be additionally applied to the embodiment(s) depicted in FIGS. 4A and 4B. Moreover, in certain embodiments, additional assembly and/or operational aspects may also be included in the ballasted punch down device 410 and which may be additionally applied to the embodiment(s) depicted in FIGS. 3A and 3B.

To indicate suitability for substitution in certain non-limiting embodiments, similar reference indicators have been applied to elements in FIGS. 4A and 4B which may be interchangeable with elements in FIGS. 3A and 3B. For example, elements depicted in FIGS. 4A and 4B may be labeled with the same numbers for the "tens" and "ones" positions as those elements in FIGS. 3A and 3B which may be interchangeable in such examples, but may utilize a "4" in the "hundreds" position instead of a "3" (e.g., the shackle 305 of FIGS. 3A and 3B and the shackle 405 of FIGS. 4A and 4B may be interchangeable in certain non-limiting embodiments). As such, in certain embodiments, description of any such interchangeable elements described hereinabove with reference to FIGS. 3A and 3B may substitute or supplement description provided below with reference to FIGS. 4A and 4B.

In some embodiments, the ballasted punch down device 410 may include a spring 408 or other connector 408 extending from a central extension 404 of the ballasted punch down device 410 to a manual extension 406 of the ballasted punch down device 410. In an example embodiment, the spring 408 may support the manual extension 406 when the manual extension 406 is in a second, extended position (e.g., as opposed to a first, unextended position).

In some embodiments, the ballasted punch down device 410 may include one or more bumpers 409 extending outwardly from a cylindrical housing 401 of the ballasted punch down device 410. In some embodiments, the one or more bumpers 409 may include a single annular bumper 409 circumscribing the cylindrical housing 401. In other embodiments, the one or more bumpers 409 may include a plurality of symmetrically distributed bumpers 409. In some embodiments, the one or more bumpers 409 may be formed from a more deformable material than the cylindrical housing 401. In an exemplary embodiment, the one or more bumpers 409 may be formed from plastic.

Referring now to FIGS. 5A-6, schematic cross-sectional views of a ballasted punch down device 510, including exemplary dimensions of the ballasted punch down device 510, are shown. FIG. 6 further depicts exemplary dimensions of a positioning of the ballasted punch down device 510 relative to a fermentation tank 511 or other fermentation vessel 511. In an exemplary embodiment, the ballasted punch down device 510 may be suspended from a bridge crane, such as one of the one or more bridge cranes 112 described in detail above with reference to FIGS. 1A-2, so as to perform pigeage. In at least one embodiment, the ballasted punch down device 510 may be assembled and configured similarly to the punch down device 300 of FIGS. 3A and 3B (that is, when a ballast is enclosed by the punch down device 300) and/or the ballasted punch down device 410 of FIGS. 4A and 4B and may operate in a substantially similar manner in practice. Accordingly, in certain embodiments, the description provided above with reference to FIGS. 3A-4B may be additionally applied to the embodiment(s) depicted in FIGS. 5A-6. Moreover, in certain embodiments, additional assembly and/or operational aspects may also be included in the ballasted punch down device 510 and which may be additionally applied to the embodiments variously depicted in FIGS. 3A-4B.

To indicate suitability for substitution in certain non-limiting embodiments, similar reference indicators have been applied to elements in FIGS. 5A-6 which may be interchangeable with elements in FIGS. 3A-4B. For example, elements depicted in FIGS. 5A-6 may be labeled with the same numbers for the "tens" and "ones" positions as those elements in FIGS. 3A and 3B which may be interchangeable in such examples, but may utilize a "5" in the "hundreds" position instead of a "3" (e.g., the shackle 305 of FIGS. 3A and 3B and the shackle 505 of FIGS. 5A-6 may be interchangeable in certain non-limiting embodiments). As such, in certain embodiments, description of any such interchangeable elements described hereinabove with reference to FIGS. 3A-4B may substitute or supplement description provided below with reference to FIGS. 5A-6.

In some embodiments, and as shown in FIG. 6, when the ballasted punch down device 510 is to be lowered into the fermentation vessel 511, a manual extension 506 may extend outwardly from the fermentation vessel 511 when the manual extension 506 is in a second, extended position (e.g., as opposed to a first, unextended position). In such embodiments, the manual extension 506 may be usable by an operator adjust a position of the ballasted punch down device 510 over the fermentation vessel 511.

In some embodiments, a ratio of an area of a base of a cylindrical housing 501 (e.g., a substantially circular surface of a lower portion 501*b* of the cylindrical housing 501) of the ballasted punch down device 510 to an area of an opening of the fermentation vessel 511 is approximately 10% (e.g., substantially 10% or between 5% and 15%).

Referring now to FIG. 7, a perspective view of a punch down device 700 adapted to enclose a ballast, wherein an outer portion 701*a* of an annular housing 701 of the punch down device 700 is depicted in dashed lines, is shown. In an exemplary embodiment, the punch down device 700, when configured with the ballast (not shown at FIG. 7), may be suspended from a bridge crane, such as one of the one or more bridge cranes 112 described in detail above with reference to FIGS. 1A-2, so as to perform pigeage. In at least one embodiment, the punch down device 700 may be assembled and configured similarly to the punch down device 300 of FIGS. 3A and 3B (e.g., when a ballast is enclosed by the punch down device 300), the ballasted punch down device 410 of FIGS. 4A and 4B, and/or the ballasted punch down device 510 of FIGS. 5A-6 and may operate in a substantially similar manner in practice. Accordingly, in certain embodiments, the description provided above with reference to FIGS. 3A-6 may be additionally applied to the embodiment(s) depicted in FIG. 7. Moreover, in certain embodiments, additional assembly and/or operational aspects may also be included in the punch down device 700 and which may be additionally applied to the embodiments variously depicted in FIGS. 3A-6.

To indicate suitability for substitution in certain non-limiting embodiments, similar reference indicators have been applied to elements in FIG. 7 which may be interchangeable with elements in FIGS. 3A-6. For example, elements depicted in FIG. 7 may be labeled with the same numbers for the "tens" and "ones" positions as those elements in FIGS. 3A and 3B which may be interchangeable in such examples, but may utilize a "7" in the "hundreds" position instead of a "3" (e.g., the shackle 305 of FIGS. 3A and 3B and the shackle 705 of FIG. 7 may be interchangeable in certain non-limiting embodiments). As such, in certain embodiments, description of any such interchangeable elements described hereinabove with reference to FIGS. 3A-6 may substitute or supplement description provided below with reference to FIG. 7.

In some embodiments, the annular housing 701 may include an outer portion 701*a* and an inner portion 701*b*. In some embodiments, the punch down device 700 may include a single, central aperture 702 formed by an interior surface of the inner portion 701*b*. Accordingly, in an exemplary embodiment, the annular housing 701 may be configured as a cylinder with the central aperture 702 extending between bases of the cylinder.

In some embodiments, the punch down device 700 may include a central support 704 adhered (e.g., spot welded) to the interior surface of the inner portion 701*b* (e.g., within the central aperture 702) and upwardly extending above the annular housing 701 to a shackle 705 of the punch down device 700. In an exemplary embodiment, the central support 704 may include vertical extensions 704*a*, 704*b* adhered to opposing portions of the interior surface of the inner portion 701*b* and a horizontal extension 704*c* coupling the vertical extensions 704*a*, 704*b* to one another and adhered to the shackle 705.

Figure 12:
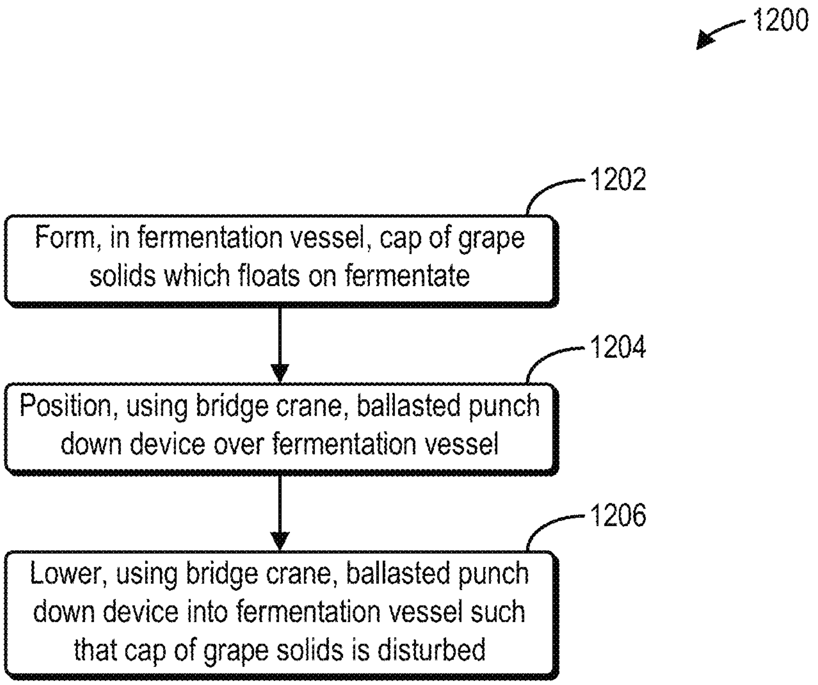
FIG. 12 shows a block diagram of a method for fermentation, including using a bridge crane to position a ballasted punch down device over a fermentation vessel and perform pigeage by lowering the ballasted punch down device into the fermentation vessel, in accordance with at least one embodiment.

Referring now to FIG. 12, a block diagram of a method 1200 for fermentation is shown. In some embodiments, pigeage during the fermentation may be performed by a ballasted punch down device. In such embodiments, the ballasted punch down device may be suspended from a bridge crane, such that the bridge crane may alternate between lowering and lifting the ballasted punch down device respectively into and out of the fermentation vessel. In certain embodiments, the method 1200 is performed as part of the method 1100 of FIG. 11, such as at the block 1108.

In some embodiments, the method 1200, or a portion thereof, may be implemented as executable instructions stored in non-transitory memory of a computing device, such as a controller communicably coupled to the one or more bridge cranes. However, though the method 1200 is described below, by way of example, as an ordered sequence of steps, embodiments of methods for fermentation are not limited to the below description of the method 1200. For instance, in certain embodiments, additional or alternative sequences of steps may be implemented, e.g., as executable instructions on such a computing device, where individual steps discussed with reference to the method 1200 may be added, removed, substituted, modified, or interchanged.

At block 1202, the method 1200 may include forming, in a fermentation vessel, a cap of grape solids which floats on a fermentate (e.g., contained in the fermentation vessel). In some embodiments, the cap of grape solids, if left undisturbed, may result in a lower quality of a wine ultimately resulting from the fermentation and/or may contribute to overheating of the fermentate.

At block 1204, the method 1200 may include positioning, using a bridge crane, a ballasted punch down device over the fermentation vessel. In some embodiments, the bridge crane may adjust a position of the ballasted punch down device along two orthogonal, horizontal axes (e.g., parallel to a ground or floor on which the fermentation vessel may rest). In certain embodiments, an operator of the bridge crane may (manually) adjust, using an extendable handle of the ballasted punch down device, the position of the ballasted punch down device along the two orthogonal, horizontal axes, such that the ballasted punch down device may be suspended over the fermentation vessel or a specified portion thereof (e.g., the position of the ballasted punch down device may be manually adjusted responsive to the ballasted punch down device not being suspended over the cap of grape solids).

At block 1206, the method 1200 may include lowering, using the bridge crane, the ballasted punch down device into the fermentation vessel such that the cap of grape solids is disturbed or otherwise disrupted. In some embodiments, the ballasted punch down device may include one or more apertures extending through a cylindrical housing of the ballasted punch down device (e.g., for venting). In such embodiments, the lowering may include submerging the ballasted punch down device in the cap of grape solids and the fermentate such that at least a portion of the cap of grape solids and at least a portion of the fermentate may freely pass through the one or more apertures. In at least one embodiment, disturbing or otherwise disrupting the cap of grape solids may increase maceration of the cap of grape solids.

In embodiments wherein the method 1200 is integrated into a winemaking process, such as the method 1100 described in detail above with reference to FIG. 11, one or more additional steps may be included in the method 1200. For example, the method 1200 may include: before lowering the ballasted punch down device into the fermentation vessel (e.g., at the block 1206), transferring, using the bridge crane, the fermentation vessel from a lower level of a winery in which the winemaking process is being performed to a mezzanine of the winery; the steps described in detail above with reference to the blocks 1202, 1204, and 1206; after lowering the ballasted punch down device into the fermentation vessel (e.g., at the block 1206), removing, using the bridge crane, the ballasted punch down device from the fermentation vessel; and after removing the ballasted punch down device from the fermentation vessel, flowing one or more portions of the fermentate from the mezzanine to the lower level.

Embodiments of the present disclosure can be described in view of the following clauses:

1. A method, including:
   - receiving, at a crush pad located at a first upper location, harvested grapes;
   - processing the harvested grapes to obtain processed grapes, including using gravity to transfer at least a portion of the harvested grapes from the crush pad to a fermentation vessel located at a first lower location;
   - lifting, using one of one or more bridge cranes, the fermentation vessel from the first lower location to a second upper location;
   - fermenting, at the second upper location, the processed grapes to obtain a fermentate;
   - draining a first portion of the fermentate by using gravity to transfer the first portion of the fermentate from the second upper location to a settling vessel located at a second lower location;
   - pressing a second portion of the fermentate by using gravity to flow the second portion of the fermentate through a press and to the settling vessel;
   - lifting, using one of the one or more bridge cranes, the settling vessel from the second lower location to a third upper location; and
   - settling the fermentate by using gravity to transfer at least a portion of the fermentate from the third upper location to a storage vessel located at a third lower location.
2. The method of clause 1, wherein each of the processing, the draining, the pressing, and the settling includes transferring material from an upper level of a building to a lower level of the building.
3. The method of clause 2, wherein the first upper location, the second upper location, and the third upper location are located on the upper level and the first lower location, the second lower location, and the third lower location are located on the lower level.
4. The method of any one of clauses 2 or 3, wherein the upper level is a mezzanine.
5. The method of any one of clauses 2-4, wherein the upper level forms a balcony over the lower level.
6. The method of any one of clauses 2-5, wherein the third lower location is located underneath the upper level, such that the upper level forms a ceiling above the third lower location.
7. The method of any one of clauses 1-6, wherein the crush pad includes a plurality of wheels, such that the crush pad is movable from the first upper location.
8. The method of any one of clauses 1-7, wherein at least one of the first upper location, the second upper location, and the third upper location and at least one of the first lower location, the second lower location, and the third lower location are visible from a single vantage point.
9. The method of any one of clauses 1-8, wherein the one of the one or more bridge cranes used to lift the fermentation vessel and the one of the one or more bridge cranes used to lift the settling vessel are a same bridge crane.
10. The method of any one of clauses 1-9, wherein the one or more bridge cranes includes a plurality of bridge cranes, wherein each bridge crane of the plurality of bridge cranes includes a bridge rail which is parallel to a bridge rail of each other bridge crane of the plurality of bridge cranes, and wherein each bridge crane of the plurality of bridge cranes is simultaneously operable to transfer material.
11. The method of any one of clauses 1-10, wherein each of the first upper location, the second upper location, the third upper location, the first lower location, and the second lower location is exposed to the one or more bridge cranes, and
    wherein the third lower location is not exposed to the one or more bridge cranes.
12. The method of any one of clauses 1-11, wherein the third lower location is within a storage cellar.
13. The method of any one of clauses 1-12, further including removing the fermentate from the storage vessel to produce a red wine.
14. The method of any one of clauses 1-13, wherein the harvested grapes are pinot noir grapes.
15. The method of any one of clauses 1-14, wherein the fermenting includes punching down a cap of grape solids formed from the processed grapes by using a punch down device suspended from one of the one or more bridge cranes.
16. A method for a winery, the method including an ordered sequence of steps including:
    - using gravity to transfer grapes from an upper level of the winery to a lower level of the winery, such that the grapes are sorted and destemmed upon reaching the lower level;
    - using a bridge crane to transfer the grapes from the lower level to the upper level, whereat the grapes are fermented to produce a fermentate;
    - using gravity to transfer the fermentate from the upper level to the lower level, such that the fermentate is drained and pressed upon reaching the lower level;
    - using the bridge crane to transfer the fermentate from the lower level to the upper level, whereat the fermentate is settled to separate a first portion of the fermentate from a second portion of the fermentate, the first portion of the fermentate having a lower content of solids than the second portion of the fermentate; and
    - using gravity to transfer the first portion of the fermentate from the upper level to the lower level.
17. The method of clause 16, wherein the upper level does not extend over an entire floorspace of the winery, and wherein at least one side of the upper level is not enclosed by a wall, such that the upper level is exposed to a space above the lower level.
18. The method of any one of clauses 16 or 17, wherein the winery is a bermed structure.
19. The method of any one of clauses 16-18, wherein the grapes and/or the fermentate are transferred from the upper level to the lower level via one or more passages which transfers the grapes and/or the fermentate away from the upper level and to an area of the lower level which is exposed to the bridge crane.

20. The method of any one of clauses 16-19, wherein the first portion of the fermentate is transferred from the upper level to the lower level via a passage which transfers the first portion of the fermentate underneath the upper level and to an area of the lower level which is not exposed to the bridge crane.

21. A method for fermentation of wine grapes, the method including:
forming, in a fermentation vessel, a cap of grape solids which floats on a fermentate during the fermentation;
positioning, using a bridge crane, a ballasted punch down device over the fermentation vessel; and
lowering, using the bridge crane, the ballasted punch down device into the fermentation vessel such that the cap of grape solids is disturbed.

22. The method of clause 21, wherein the ballasted punch down device includes a cylindrical housing which encloses a ballast.

23. The method of clause 22, wherein one or more apertures extends between bases of the cylindrical housing,
wherein the ballast circumscribes the one or more apertures, and
wherein lowering the ballasted punch down device includes submerging the ballasted punch down device in the cap of grape solids and the fermentate such that at least a portion of the cap of grape solids and at least a portion of the fermentate freely pass through the one or more apertures.

24. The method of clause 23, wherein the one or more apertures occupies less than ⅙ of an area of either of the bases of the cylindrical housing.

25. The method of any one of clauses 23 or 24, wherein the one or more apertures includes a plurality of symmetrically distributed apertures.

26. The method of any one of clauses 22-25, wherein a ratio of an area of a base of the cylindrical housing to an area of an opening of the fermentation vessel into which the ballasted punch down device is lowered is approximately 10%.

27. The method of any one of clauses 22-26, wherein a base of the cylindrical housing has a radius of 5 to 15 inches.

28. The method of any one of clauses 22-27, wherein the cylindrical housing is formed from stainless steel, and wherein the ballast is formed from concrete.

29. The method of any one of clauses 22-28, wherein the ballast is hermetically sealed within the cylindrical housing such that the ballast cannot contaminate the fermentate.

30. The method of any one of clauses 22-29, wherein the ballasted punch down device includes one or more plastic bumpers extending outwardly from the cylindrical housing.

31. The method of any one of clauses 21-30, wherein lowering the ballasted punch down device into the fermentation vessel includes applying an amount of pressure to the cap of grape solids and the fermentate equal to at least 0.1 psi for each 15 cubic inches of the cap of grape solids and the fermentate.

32. The method of any one of clauses 21-31, wherein the ballasted punch down device includes an extension including a handle, and
wherein the method further includes manually adjusting, using the handle, a position of the ballasted punch down device over the fermentation vessel.

33. The method of clause 32, further including adjusting the extension from a first position in which the extension is not extended to a second position in which the extension is extended.

34. The method of clause 33, wherein the handle extends outwardly from the fermentation vessel when the extension is in the second position.

35. The method of any one of clauses 21-35, wherein disturbing the cap of grape solids increases maceration of the cap of grape solids.

36. The method of any one of clauses 21-35, wherein the bridge crane is operated in a winery including a mezzanine overlooking a lower level, and
wherein the method further includes:
before lowering the ballasted punch down device into the fermentation vessel, transferring, using the bridge crane, the fermentation vessel from the lower level to the mezzanine;
removing, using the bridge crane, the ballasted punch down device from the fermentation vessel; and
after removing the ballasted punch down device from the fermentation vessel, flowing one or more portions of the fermentate from the mezzanine to the lower level.

37. A method, including:
using a bridge crane to translate a ballasted punch down device along a first axis, the ballasted punch down device being suspended from a girder of the bridge crane; and
using the bridge crane to translate the ballasted punch down device along a second axis orthogonal to the first axis, including lowering the ballasted punch down device into an open vessel containing a liquid on which a cap of solids floats.

38. The method of clause 37, further including using the bridge crane to translate the ballasted punch down device along a third axis orthogonal to each of the first axis and the second axis, wherein translation of the ballasted punch down device along each of first axis and the third axis positions the ballasted punch down device to be lowered into the open vessel.

39. The method of clause 38, wherein the first axis, the second axis, and the third axis are line segments defining dimensions of a rectangular prism which delimits a volume in which objects suspended from the girder of the bridge crane can be translated.

40. The method of any one of clauses 38-40, wherein the cap of solids is a cap of pinot noir grape solids resulting from a fermentation process.

41. A method for a production area of a winery, the method including:
receiving, at an upper level of the production area, a mobile crush pad containing harvested pinot noir grapes;
processing the harvested pinot noir grapes to obtain processed pinot noir grapes, including using gravity to transfer at least a portion of the harvested pinot noir grapes from the mobile crush pad to a fermentation vessel located at a lower level of the production area;
lifting, using a bridge crane, the fermentation vessel from the lower level to the upper level;
fermenting, at the upper level, the processed pinot noir grapes to obtain a fermentate;

draining a first portion of the fermentate by using gravity to transfer the first portion of the fermentate from the upper level to a settling vessel located at the lower level;

pressing a second portion of the fermentate by using gravity to flow the second portion of the fermentate through a press and to the settling vessel, the second portion of the fermentate having a higher content of solids than the first portion of the fermentate;

lifting, using the bridge crane, the settling vessel from the lower level to the upper level;

settling the fermentate by using gravity to transfer at least a portion of the fermentate from the upper level to a storage vessel located on the lower level; and removing the fermentate from the storage vessel to produce a red wine, wherein the upper level is a mezzanine which forms a balcony over the lower level, such that at least a portion of the upper level and at least a portion of the lower level are visible from a single vantage point.

42. A method for fermentation of pinot noir grapes, the method including:

forming, in a fermentation vessel, a cap of pinot noir grape solids which floats on a fermentate during the fermentation;

positioning, using a bridge crane, a ballasted punch down device over the fermentation vessel, the ballasted punch down device including:

a stainless steel cylindrical housing;

one or more venting apertures extending between bases of the stainless steel cylindrical housing;

one or more plastic bumpers extending outwardly from the stainless steel cylindrical housing;

a concrete ballast hermetically sealed within the stainless steel cylindrical housing, the concrete ballast circumscribing the one or more venting apertures; and an extendable handle extending outwardly from the fermentation vessel;

responsive to the ballasted punch down device not being suspended over the cap of pinot noir grape solids, adjusting, using the extendable handle, a position of the ballasted punch down device over the fermentation vessel; and submerging, using the bridge crane, the ballasted punch down device in the fermentation vessel such that the cap of pinot noir grapes solids is disturbed to increase maceration of the cap of pinot noir grape solids and at least a portion of the cap of pinot noir grape solids and at least a portion of the fermentate freely pass through the one or more venting apertures.

The specification and drawings are to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

The invention claimed is:

1. A method for fermentation of pinot noir grapes, the method comprising:

forming, in a fermentation vessel, a cap of pinot noir grape solids which floats on a fermentate during the fermentation;

positioning, using a bridge crane, a ballasted punch down device over the fermentation vessel, the ballasted punch down device comprising:

a stainless steel cylindrical housing;

one or more venting apertures extending between bases of the stainless steel cylindrical housing;

one or more plastic bumpers extending outwardly from the stainless steel cylindrical housing;

a concrete ballast hermetically sealed within the stainless steel cylindrical housing, the concrete ballast circumscribing the one or more venting apertures; and an extendable handle extending outwardly from the fermentation vessel;

responsive to the ballasted punch down device not being suspended over the cap of pinot noir grape solids, adjusting, using the extendable handle, a position of the ballasted punch down device over the fermentation vessel; and submerging, using the bridge crane, the ballasted punch down device in the fermentation vessel such that the cap of pinot noir grapes solids is disturbed to increase maceration of the cap of pinot noir grape solids and at least a portion of the cap of pinot noir grape solids and at least a portion of the fermentate freely pass through the one or more venting apertures.

2. A method for fermentation of wine grapes, the method comprising:

forming, in a fermentation vessel, a cap of grape solids which floats on a fermentate during the fermentation;

positioning, using a bridge crane, a ballasted punch down device over the fermentation vessel, the ballasted punch down device comprising:

a cylindrical housing;

one or more apertures extending between bases of the cylindrical housing;

one or more bumpers extending outwardly from the cylindrical housing;

a ballast enclosed within the cylindrical housing, the ballast circumscribing the one or more apertures; and an extension including a handle; and responsive to the ballasted punch down device not being suspended over the cap of grape solids, adjusting, using the handle, a position of the ballasted punch down device over the fermentation vessel; and lowering, using the bridge crane, the ballasted punch down device into the fermentation vessel such that the cap of grape solids is disturbed to increase maceration of the cap of grape solids and at least a portion of the cap of grape solids and at least a portion of the fermentate freely pass through the one or more apertures.

3. The method of claim 2, wherein lowering the ballasted punch down device comprises submerging the ballasted punch down device in the cap of grape solids and the fermentate.

4. The method of claim 2, wherein the one or more apertures occupies less than ⅙ of an area of either of the bases of the cylindrical housing.

5. The method of claim 2, wherein the one or more apertures comprises a plurality of symmetrically distributed apertures.

6. The method of claim 2, wherein a ratio of an area of each of the bases of the cylindrical housing to an area of an opening of the fermentation vessel into which the ballasted punch down device is lowered is approximately 10%.

7. The method of claim 2, wherein each of the bases of the cylindrical housing has a radius of 5 to 15 inches.

8. The method of claim 2, wherein the cylindrical housing is formed from stainless steel, wherein the one or more bumpers is formed from plastic, and wherein the ballast is formed from concrete.

9. The method of claim 2, wherein the ballast is hermetically sealed within the cylindrical housing such that the ballast cannot contaminate the fermentate.

10. The method of claim 2, wherein lowering the ballasted punch down device into the fermentation vessel comprises applying an amount of pressure to the cap of grape solids and the fermentate equal to at least 0.1 psi for each 15 cubic inches of the cap of grape solids and the fermentate.

11. The method of claim 2, further comprising adjusting the extension from a first position in which the extension is not extended to a second position in which the extension is extended.

12. The method of claim 11, wherein, if the extension is in the second position, the handle is extended outwardly from the fermentation vessel.

13. The method of claim 2, wherein the cap of grape solids is a the cap of pinot noir grape solids.

* * * * *